US011691332B2

(12) United States Patent
Zenou et al.

(10) Patent No.: US 11,691,332 B2
(45) Date of Patent: Jul. 4, 2023

(54) SYSTEMS AND METHODS FOR 3D PRINTING WITH VACUUM ASSISTED LASER PRINTING MACHINE

(71) Applicant: IO Tech Group Ltd., London (GB)

(72) Inventors: Michael Zenou, Hashmonaim (IL); Ziv Gilan, Kfar-harif (IL); Guy Nesher, Nes Ziona (IL)

(73) Assignee: IO Tech Group Ltd., Modiin (IL)

( * ) Notice: Subject to any disclaimer, the term of this patent is extended or adjusted under 35 U.S.C. 154(b) by 383 days.

(21) Appl. No.: 17/247,983

(22) Filed: Jan. 4, 2021

(65) Prior Publication Data

US 2022/0040912 A1 Feb. 10, 2022

Related U.S. Application Data

(60) Provisional application No. 62/706,212, filed on Aug. 5, 2020.

(51) Int. Cl.
| | |
|---|---|
| *B29C 64/147* | (2017.01) |
| *B29C 64/112* | (2017.01) |
| *B29C 64/364* | (2017.01) |
| *B29C 64/223* | (2017.01) |

(Continued)

(52) U.S. Cl.
CPC .......... *B29C 64/112* (2017.08); *B29C 64/147* (2017.08); *B29C 64/188* (2017.08);
(Continued)

(58) Field of Classification Search
CPC .................................................. B29C 64/147
See application file for complete search history.

(56) References Cited

U.S. PATENT DOCUMENTS 5,155,324 A 10/1992 Deckard et al.
5,174,843 A * 12/1992 Natter ................... B29C 64/147
156/273.7

(Continued)

FOREIGN PATENT DOCUMENTS

CN 103597589 A 2/2014
DE 102011083627 A1 3/2013
(Continued)

OTHER PUBLICATIONS

Final Office Action dated Aug. 16, 2022, for U.S. Appl. No. 15/949,281, filed Apr. 22, 2020, 14 pgs.
(Continued)

*Primary Examiner* — Timothy Kennedy
(74) *Attorney, Agent, or Firm* — Ascenda Law Group, PC

(57) ABSTRACT

Systems and methods in which a material or materials (e.g., a viscous material) are printed or otherwise transferred onto an intermediate substrate at a printing unit(s). The intermediate substrate having an image of material printed thereon is subsequently transferred to a sample building unit, and the image of material is transferred from the intermediate substrate to a sample at the sample building unit. Optionally, the printing unit(s) includes a coating system that creates a uniform layer of the material on a donor substrate, and the material is transferred from the donor substrate onto the intermediate substrate at the printing unit(s). Each of the printing units may employ a variety of printing or other transfer technologies. The system may also include material curing, heating, sintering, ablating, material filling, imaging and cleaning units to aid in the overall process.

25 Claims, 19 Drawing Sheets

(51) Int. Cl.

| | | |
|---|---|---|
| B29C 64/188 | (2017.01) | |
| B29C 64/245 | (2017.01) | |
| B29C 64/386 | (2017.01) | |
| B29C 64/35 | (2017.01) | |
| B29C 64/268 | (2017.01) | |
| B33Y 10/00 | (2015.01) | |
| B33Y 30/00 | (2015.01) | |
| B33Y 50/00 | (2015.01) | |
| B33Y 80/00 | (2015.01) | |
| B33Y 40/20 | (2020.01) | |
| B29L 31/34 | (2006.01) | |

(52) U.S. Cl.
CPC .......... *B29C 64/223* (2017.08); *B29C 64/245* (2017.08); *B29C 64/268* (2017.08); *B29C 64/35* (2017.08); *B29C 64/364* (2017.08); *B29C 64/386* (2017.08); *B29L 2031/3425* (2013.01); *B33Y 10/00* (2014.12); *B33Y 30/00* (2014.12); *B33Y 40/20* (2020.01); *B33Y 50/00* (2014.12); *B33Y 80/00* (2014.12)

(56) References Cited

U.S. PATENT DOCUMENTS

| | | | | |
|---|---|---|---|---|
| 5,192,559 | A * | 3/1993 | Hull | B29C 64/188 425/375 |
| 5,200,285 | A * | 4/1993 | Carrish | G03G 15/0163 399/302 |
| 5,204,055 | A | 4/1993 | Sachs et al. | |
| 5,236,637 | A | 8/1993 | Hull | |
| 5,352,310 | A * | 10/1994 | Natter | B32B 38/0008 156/273.5 |
| 5,436,083 | A | 7/1995 | Haluska et al. | |
| 5,506,607 | A | 4/1996 | Sanders, Jr. et al. | |
| 5,593,531 | A * | 1/1997 | Penn | G03G 15/04045 425/174.8 E |
| 5,637,175 | A * | 6/1997 | Feygin | B29C 64/141 264/405 |
| 5,740,051 | A | 4/1998 | Sanders, Jr. et al. | |
| 5,837,960 | A | 11/1998 | Lewis et al. | |
| 6,056,843 | A * | 5/2000 | Morita | B29C 64/147 156/267 |
| 6,122,036 | A | 9/2000 | Yamasaki et al. | |
| 6,206,672 | B1 * | 3/2001 | Grenda | B29C 64/141 264/484 |
| 6,537,359 | B1 | 3/2003 | Spa | |
| 7,198,736 | B2 | 4/2007 | Kasuga et al. | |
| 7,438,846 | B2 | 10/2008 | John | |
| 7,658,603 | B2 | 2/2010 | Medina et al. | |
| 7,731,887 | B2 * | 6/2010 | Hull | B33Y 10/00 264/405 |
| 7,771,183 | B2 * | 8/2010 | Hull | B29C 64/35 425/375 |
| 7,892,474 | B2 | 2/2011 | Snkolnik et al. | |
| 8,236,373 | B2 | 8/2012 | Fumo et al. | |
| 8,252,223 | B2 | 8/2012 | Medina et al. | |
| 8,488,994 | B2 * | 7/2013 | Hanson | B33Y 10/00 399/130 |
| 8,740,040 | B2 | 6/2014 | Choi et al. | |
| 8,879,957 | B2 * | 11/2014 | Hanson | B33Y 10/00 399/130 |
| 9,636,873 | B2 | 5/2017 | Joyce | |
| 9,744,730 | B2 * | 8/2017 | Comb | G03G 15/225 |
| 9,808,822 | B2 | 11/2017 | Martensson et al. | |
| 9,901,983 | B2 | 2/2018 | Hovel et al. | |
| 9,919,479 | B2 * | 3/2018 | Baecker | B29C 64/147 |
| 10,011,071 | B2 | 7/2018 | Batchelder | B33Y 50/02 |
| 10,137,634 | B2 * | 11/2018 | Ruiz | B29C 64/205 |
| 10,144,034 | B2 | 12/2018 | Zenou | |
| 10,144,175 | B2 * | 12/2018 | Batchelder | B29C 64/188 |
| 10,180,649 | B2 * | 1/2019 | Nowak | G03G 15/225 |
| 10,369,744 | B2 * | 8/2019 | Winters | G03G 15/1625 |
| 10,723,072 | B1 * | 7/2020 | Zeman | B29C 64/141 |
| 2002/0139264 | A1 * | 10/2002 | Bartscher | G03G 15/2007 101/232 |
| 2004/0101619 | A1 | 5/2004 | Camorani | |
| 2005/0109734 | A1 | 5/2005 | Kuriyama et al. | |
| 2005/0212888 | A1 | 9/2005 | Lehmann et al. | |
| 2007/0164089 | A1 | 7/2007 | Gaugler | |
| 2007/0201122 | A1 | 8/2007 | Dozeman et al. | |
| 2008/0166490 | A1 | 7/2008 | Hogan et al. | |
| 2009/0074987 | A1 | 3/2009 | Auyeung et al. | |
| 2009/0217517 | A1 | 9/2009 | Pique et al. | |
| 2009/0274833 | A1 | 11/2009 | Li et al. | |
| 2011/0017841 | A1 | 1/2011 | Holm et al. | |
| 2013/0078013 | A1 * | 3/2013 | Chillscyzn | B29C 64/147 399/307 |
| 2013/0176700 | A1 | 7/2013 | Stevens et al. | |
| 2013/0186558 | A1 * | 7/2013 | Comb | B29C 64/147 156/277 |
| 2013/0224474 | A1 | 8/2013 | Theunissen et al. | |
| 2014/0374958 | A1 * | 12/2014 | Taniuchi | B33Y 30/00 425/375 |
| 2015/0033557 | A1 | 2/2015 | Kotler et al. | |
| 2015/0239236 | A1 | 8/2015 | Stefani et al. | |
| 2016/0193688 | A1 * | 7/2016 | Kironn | B29C 64/188 219/76.12 |
| 2016/0233089 | A1 | 8/2016 | Zenou et al. | |
| 2017/0120260 | A1 | 5/2017 | Oetjen | |
| 2017/0189995 | A1 | 7/2017 | Zenou et al. | |
| 2017/0210142 | A1 | 7/2017 | Kotler et al. | |
| 2017/0250294 | A1 | 8/2017 | Zenou et al. | |
| 2017/0260359 | A1 * | 9/2017 | Hanyu | C08K 5/103 |
| 2017/0297111 | A1 * | 10/2017 | Myerberg | B28B 1/001 |
| 2017/0306495 | A1 | 10/2017 | Kotler et al. | |
| 2017/0348908 | A1 | 12/2017 | Liu et al. | |
| 2018/0015502 | A1 | 1/2018 | Zenou | |
| 2018/0090314 | A1 | 3/2018 | Kotler et al. | |
| 2018/0193948 | A1 | 7/2018 | Zenou et al. | |
| 2018/0281243 | A1 | 10/2018 | Zenou et al. | |
| 2019/0143449 | A1 | 5/2019 | Zenou | |
| 2019/0150292 | A1 | 5/2019 | Tsukada et al. | |
| 2019/0322036 | A1 | 10/2019 | Zenou et al. | |
| 2020/0350275 | A1 | 11/2020 | Zenou et al. | |
| 2021/0028141 | A1 | 1/2021 | Zenou et al. | |
| 2021/0237184 | A1 | 8/2021 | Zenou et al. | |
| 2021/0267067 | A1 | 8/2021 | Ziv et al. | |
| 2021/0385951 | A1 | 12/2021 | Zenou | |

FOREIGN PATENT DOCUMENTS

| | | |
|---|---|---|
| DE | 10 2017 120750 A1 | 3/2019 |
| EP | 1213083 A2 | 6/2002 |
| EP | 3032933 A1 | 6/2016 |
| EP | 3089573 A1 | 11/2016 |
| EP | 3 219 412 A1 | 9/2017 |
| EP | 3468312 A1 | 4/2019 |
| JP | H01 221466 A | 9/1989 |
| WO | 01/72489 A2 | 10/2001 |
| WO | 2007/020644 A1 | 2/2007 |
| WO | 2007/026366 A1 | 3/2007 |
| WO | 2007/084888 A2 | 7/2007 |
| WO | 2014/078537 A1 | 5/2014 |
| WO | 2014/113937 A1 | 7/2014 |
| WO | 2014/126837 A2 | 8/2014 |
| WO | 2015/144967 A2 | 10/2015 |
| WO | 2015/192146 A1 | 12/2015 |
| WO | 2016/020817 A1 | 2/2016 |
| WO | 2016/124708 A1 | 8/2016 |
| WO | 2016/198291 A1 | 12/2016 |
| WO | 2018/003000 A1 | 1/2018 |
| WO | 2018/104432 A1 | 6/2018 |
| WO | 2018/136480 A1 | 7/2018 |
| WO | 2018/216002 A1 | 11/2018 |

OTHER PUBLICATIONS

Chinese Patent Publication No. 103597589 A, published Feb. 19, 2014, English translation, 33 pgs.

(56) References Cited

OTHER PUBLICATIONS

Amendment filed Jul. 22, 2022, for U.S. Appl. No. 17/302,449, filed May 3, 2021, 7 pgs.
Advisory Action dated Aug. 10, 2022, for U.S. Appl. No. 17/302,449, filed May 3, 2021, 3 pgs.
Notice of Allowance dated Sep. 8, 2022, for U.S. Appl. No. 17/302,449, filed May 3, 2021, 9 pgs.
Amendment filed Jul. 5, 2022, for U.S. Appl. No. 17/247,981, filed Jan. 4, 2021, 8 pgs.
International Search Report and Written Opinion dated Apr. 29, 2021, from ISA/European Patent Office, for International Patent Application No. PCT/IB2021/050027 (filed Jan. 5, 2021), 11 pgs.
International Preliminary Report on Patentability dated Jul. 5, 2022, from the IPEA/European Patent Office, for International Patent Application No. PCT/IB021/050027 (filed Jan. 5, 2021), 6 pgs.
International Search Report and Written Opinion dated Jun. 24, 2020, from the ISA/European Patent Office, for International Patent Application No. PCT/IB2020/053827 (filed Apr. 22, 2020), 15 pages.
Written Opinion of the International Preliminary Examining Authority dated Mar. 19, 2021, from the IPEA/European Patent Office, for International Patent Application No. PCT/IB2020/053827 (filed Apr. 22, 2020), 6 pgs.
International Search Report and Written Opinion dated Apr. 16, 2021, from the ISA/European Patent Office, for International Patent Application No. PCT/IB2021/050025 (filed Jan. 5, 2021), 13 pgs.
International Search Report and Written Opinion dated Apr. 1, 2021, from the ISA/European Patent Office, for International Patent Application No. PCT/IB2021/050026 (filed Jan. 5, 2021), 13 pgs.
Non-Final Office Action dated Jan. 28, 2022, for U.S. Appl. No. 17/302,449, filed May 3, 2021, 10 pgs.
International Preliminary Report on Patentability dated Jul. 27, 2021, from the IPEA/European Patent Office, for International Patent Application No. PCT/IB2020/053827 (filed Apr. 22, 2020), 37 pgs.
International Preliminary Report on Patentability dated Jan. 14, 2022, from the IPEA/European Patent Office, for International Patent Application No. PCT/IB2021/050025 (filed May 1, 2021), 19 pgs.
Nritten Opinion of the International Preliminary Examining Authority mailed Jan. 5, 2022, from the IPEA/European Patent Office, for International Patent Application No. PCT/IB2021/050026 (filed May 1, 2021), 8 pgs.
Non-Final Office Action dated Feb. 15, 2022, for U.S. Appl. No. 16/807,489, filed Mar. 3, 2020, 19 pgs.
Amendment filed Mar. 28, 2022, for U.S. Appl. No. 16/807,489, filed Mar. 3, 2020, 17 pgs.
Amendment filed Apr. 4, 2022, for U.S. Appl. No. 17/302,449, filed May 3, 2021, 10 pgs.
Non-Final Office Action dated May 9, 2022, for U.S. Appl. No. 15/949,281, filed Apr. 22, 2020, 11 pgs.
Notice of Allowance dated Jun. 16, 2022, for U.S. Appl. No. 16/807,489, filed Mar. 3, 2020, 9 pgs.
Final Office Action dated Jun. 9, 2022, for U.S. Appl. No. 17/302,449, filed May 3, 2021, 11 pgs.
Non-Final Office Action dated Jun. 23, 2022 for U.S. Appl. No. 17/247,781, filed Jan. 4, 2021, 14 pgs.
International Preliminary Report on Patentability dated Jun. 15, 2022, from the IPEA/European Patent Office, for International Patent Application No. PCT/IB/2021/050026 (filed Jan. 5, 2021), 6 pgs.
Amendment filed Jul. 14, 2022, for U.S. Appl. No. 15/929,281, filed Apr. 22, 2020, 10 pgs.

\* cited by examiner

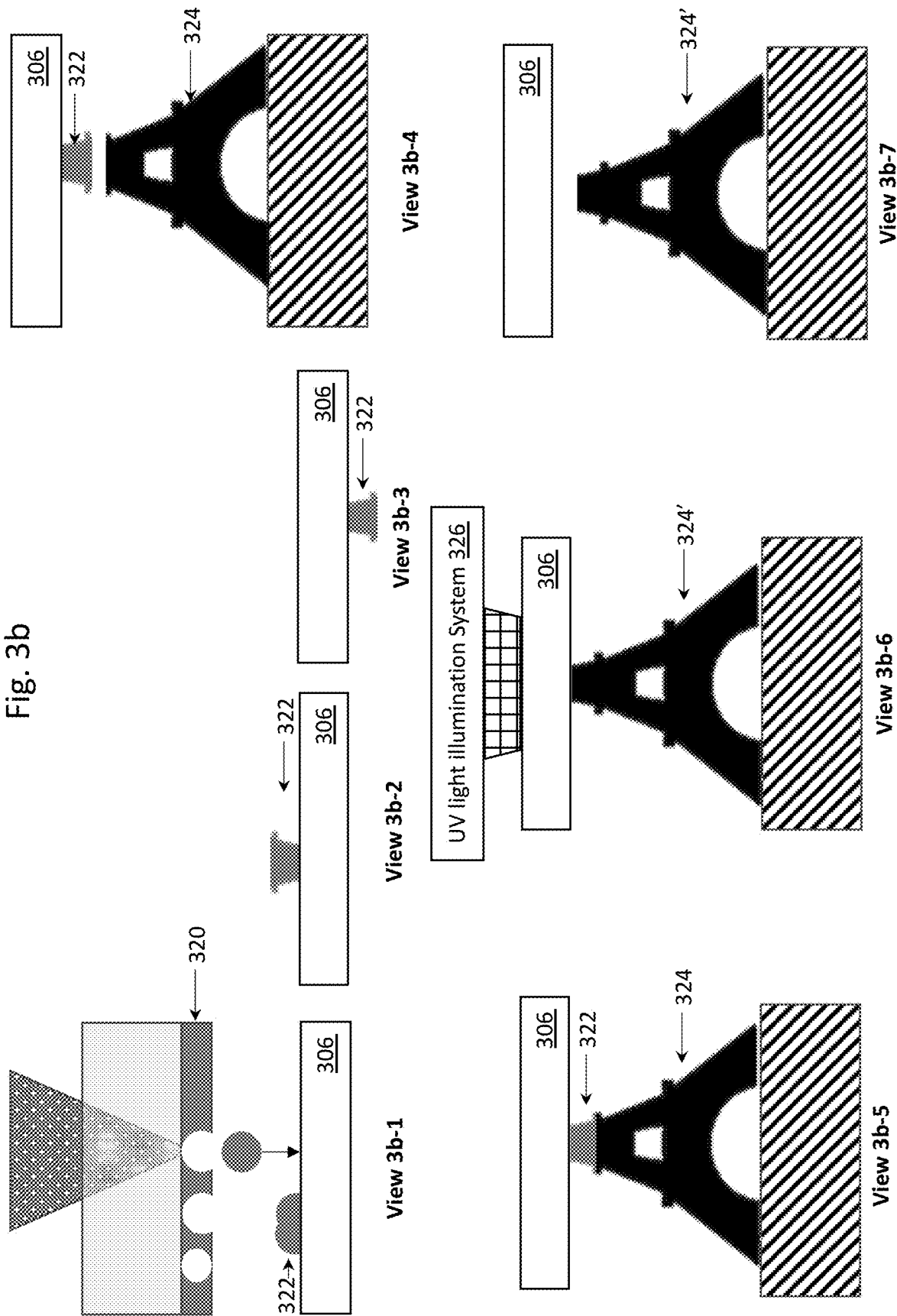

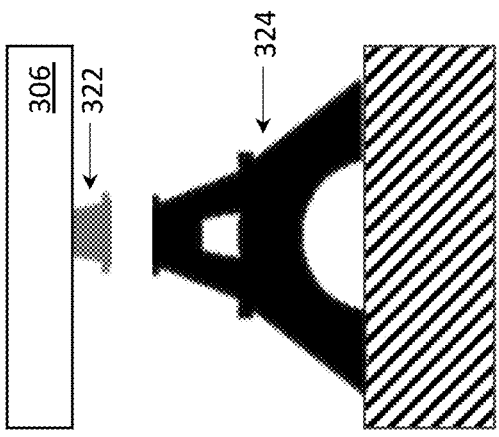
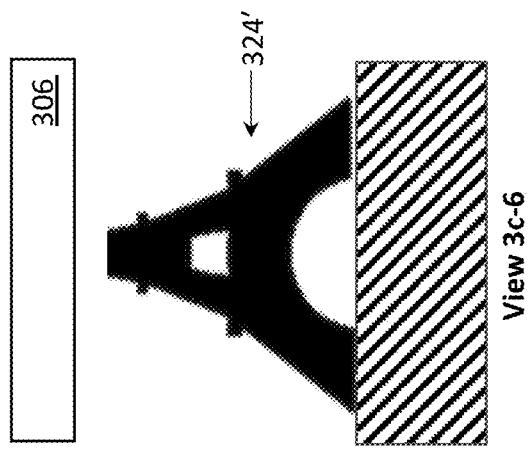
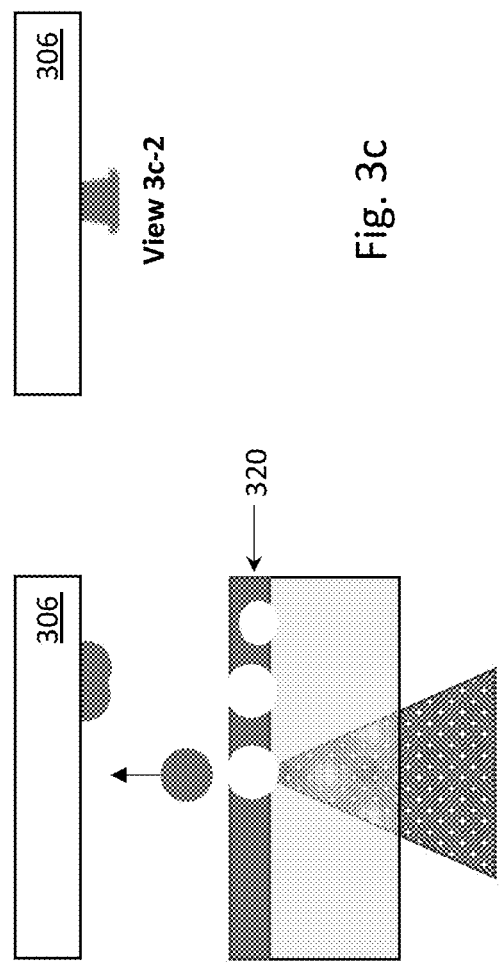
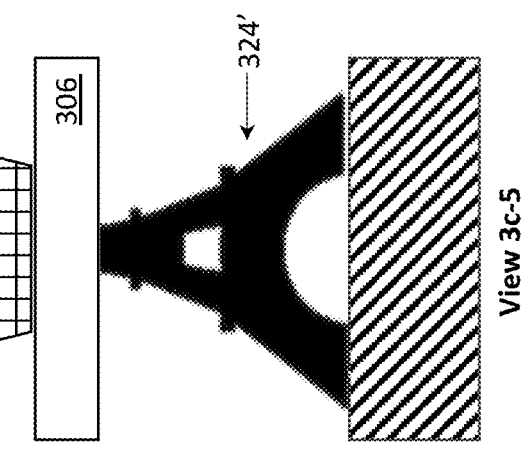
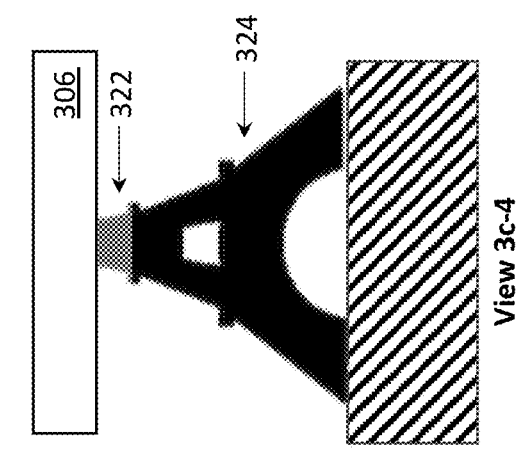
Fig. 3c

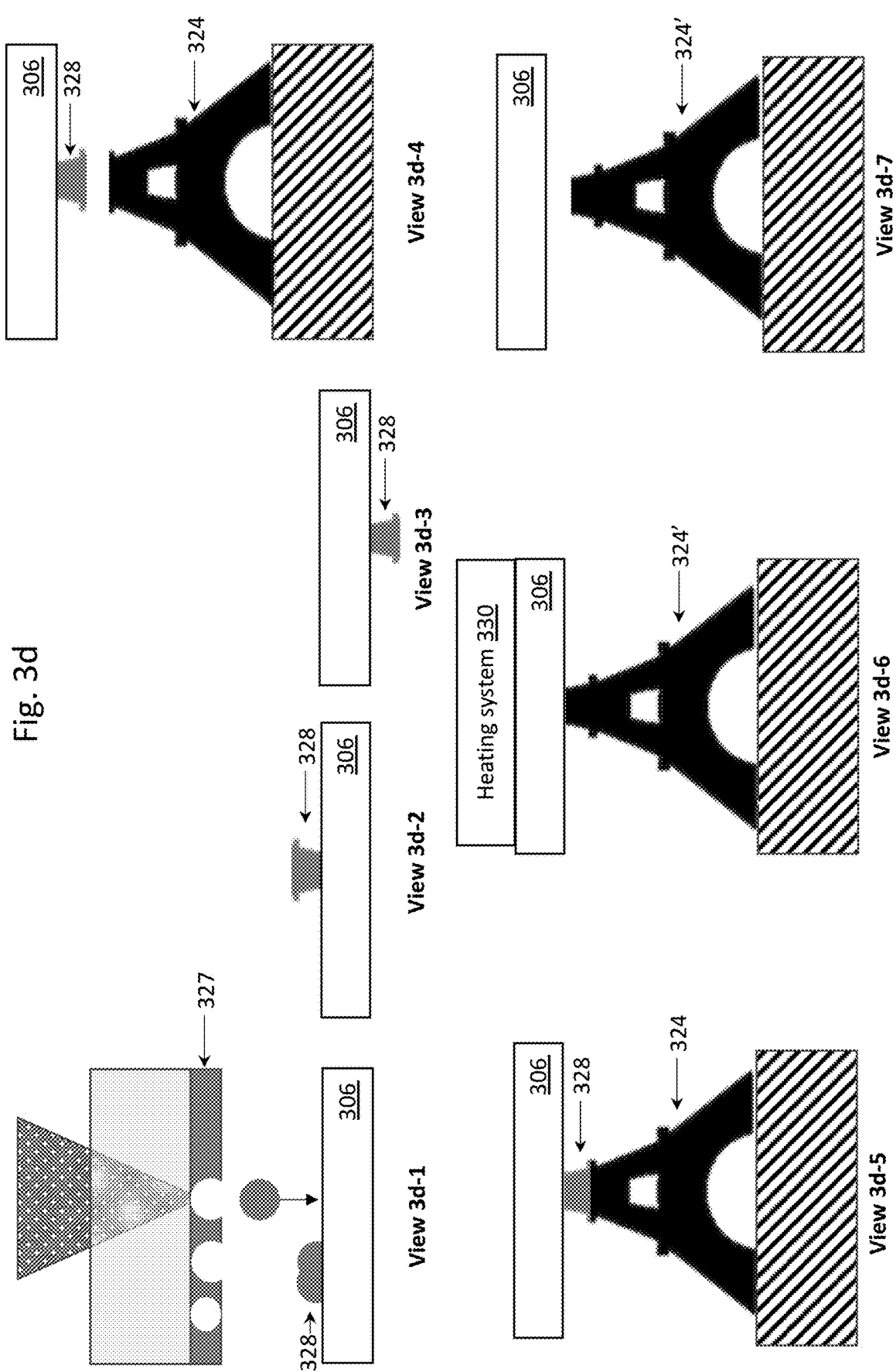

Fig. 3e
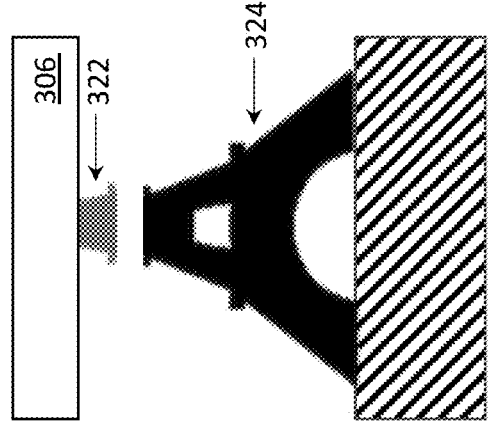
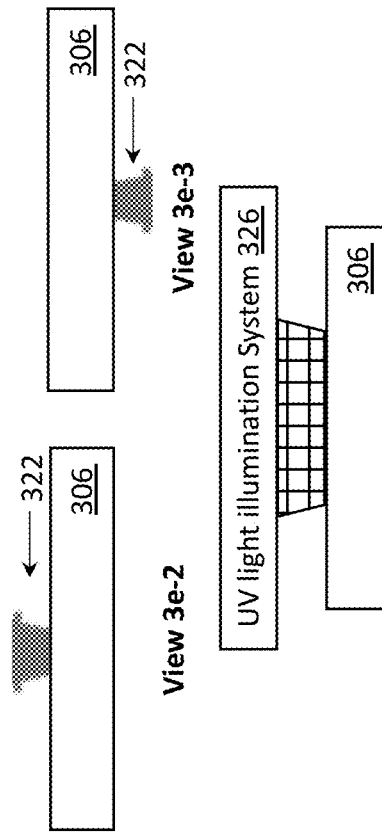
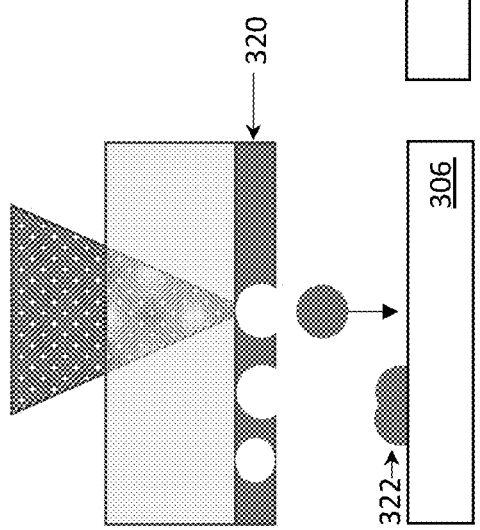
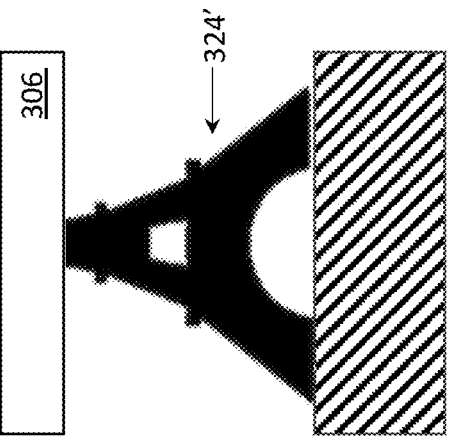
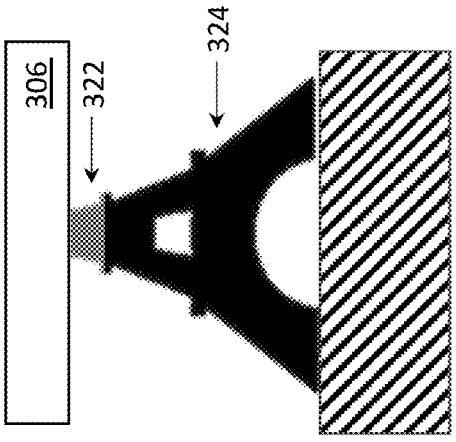

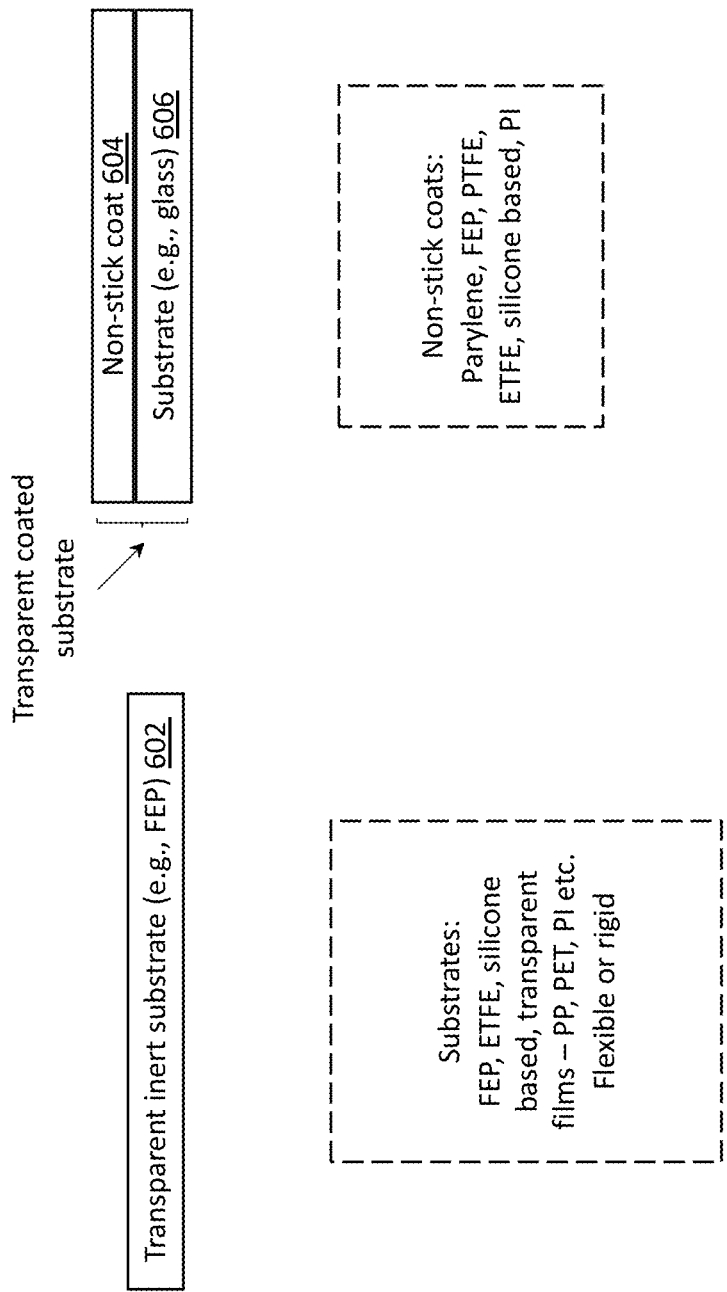

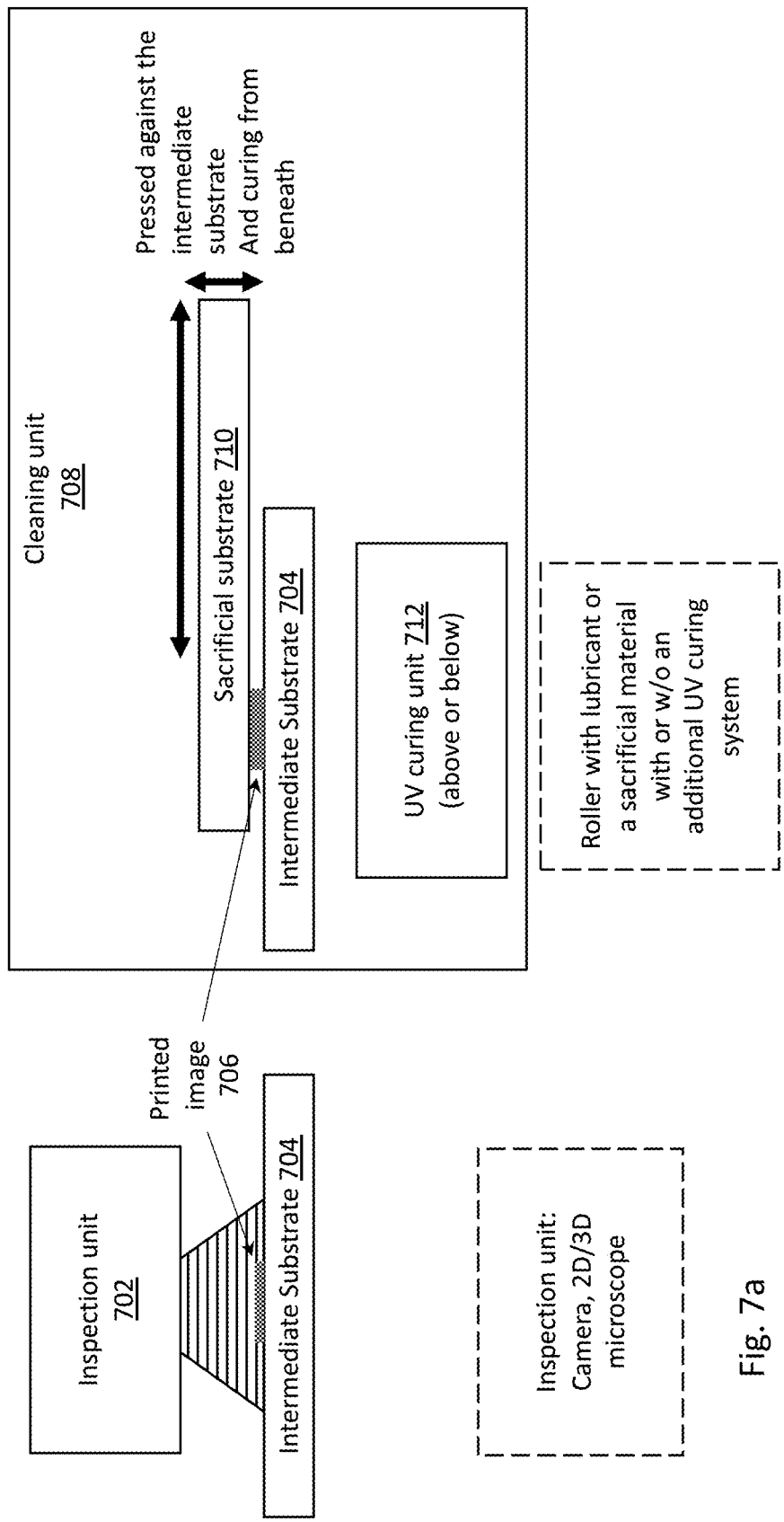

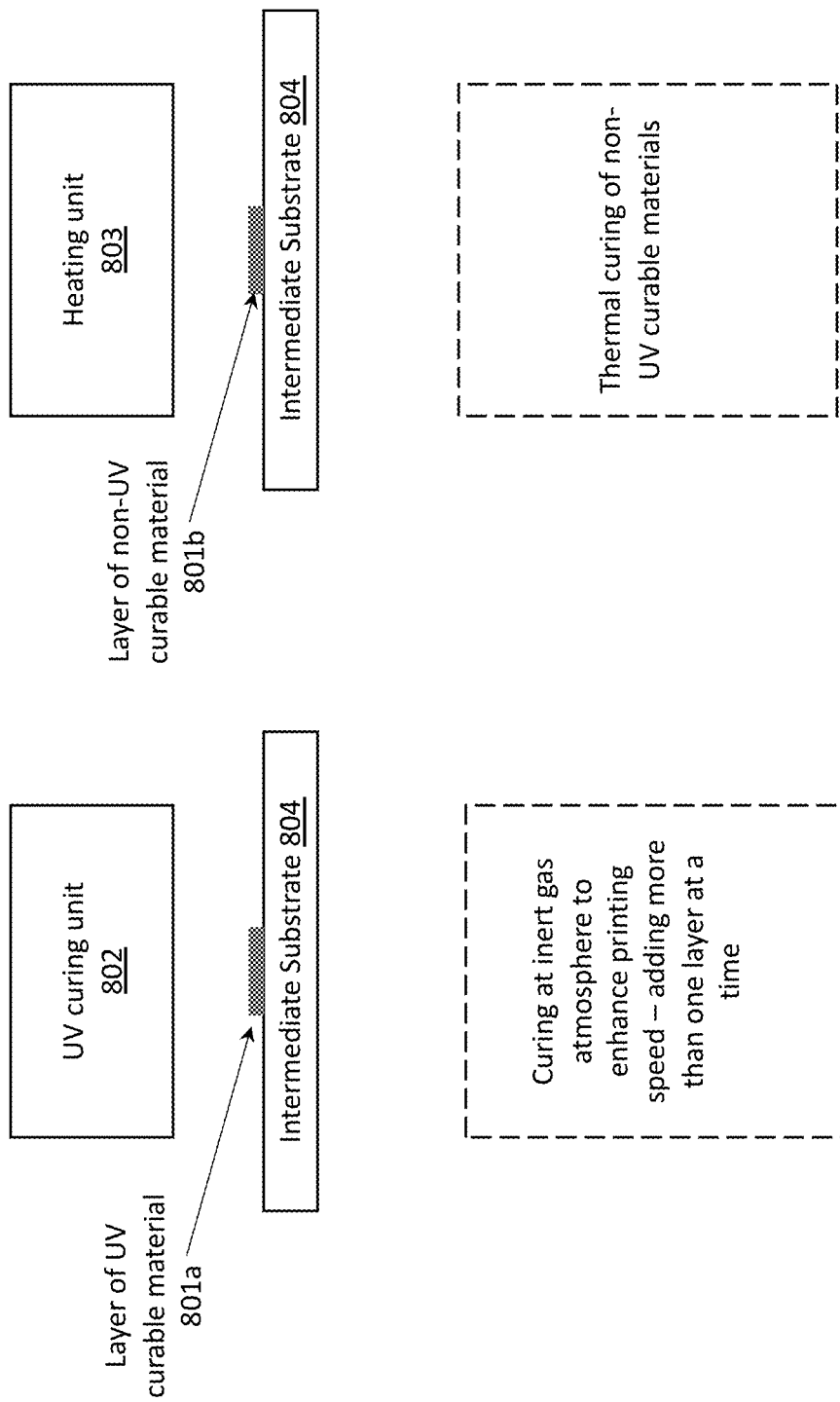

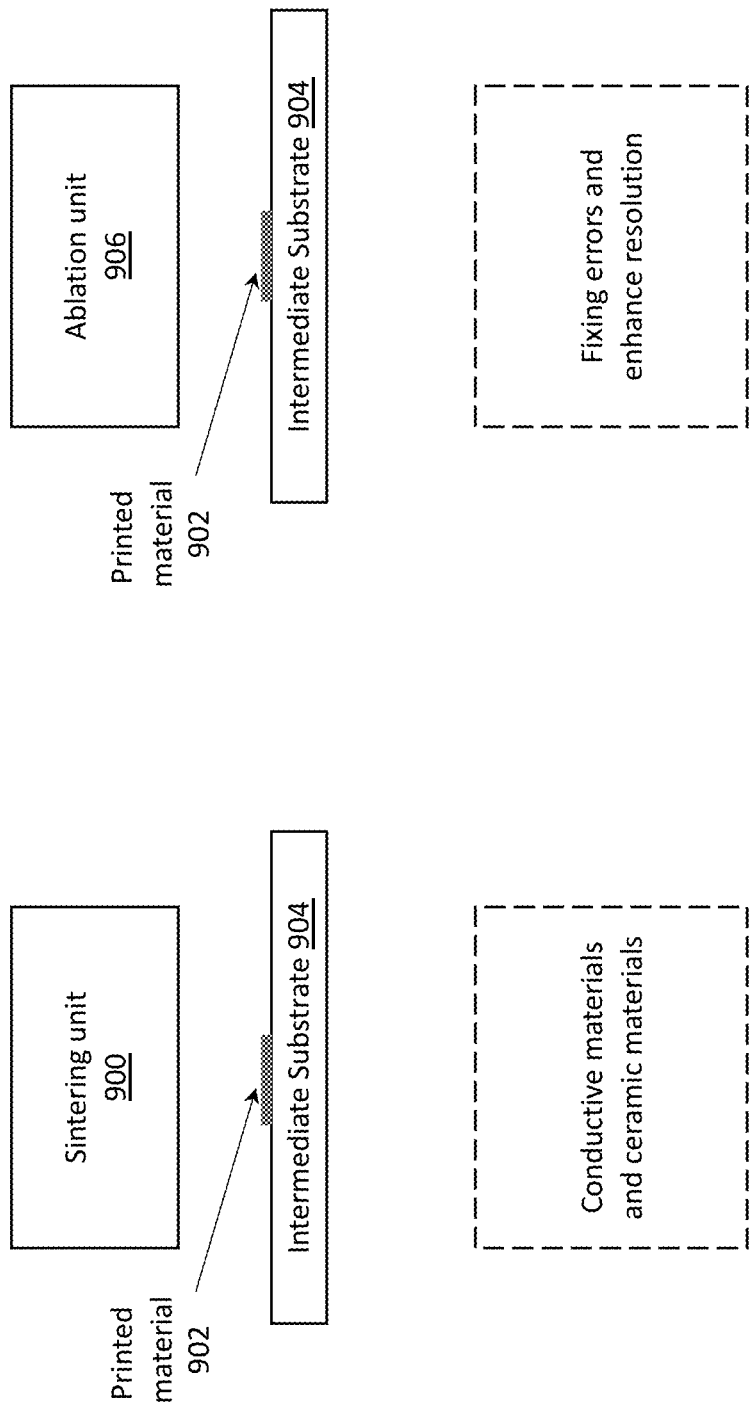

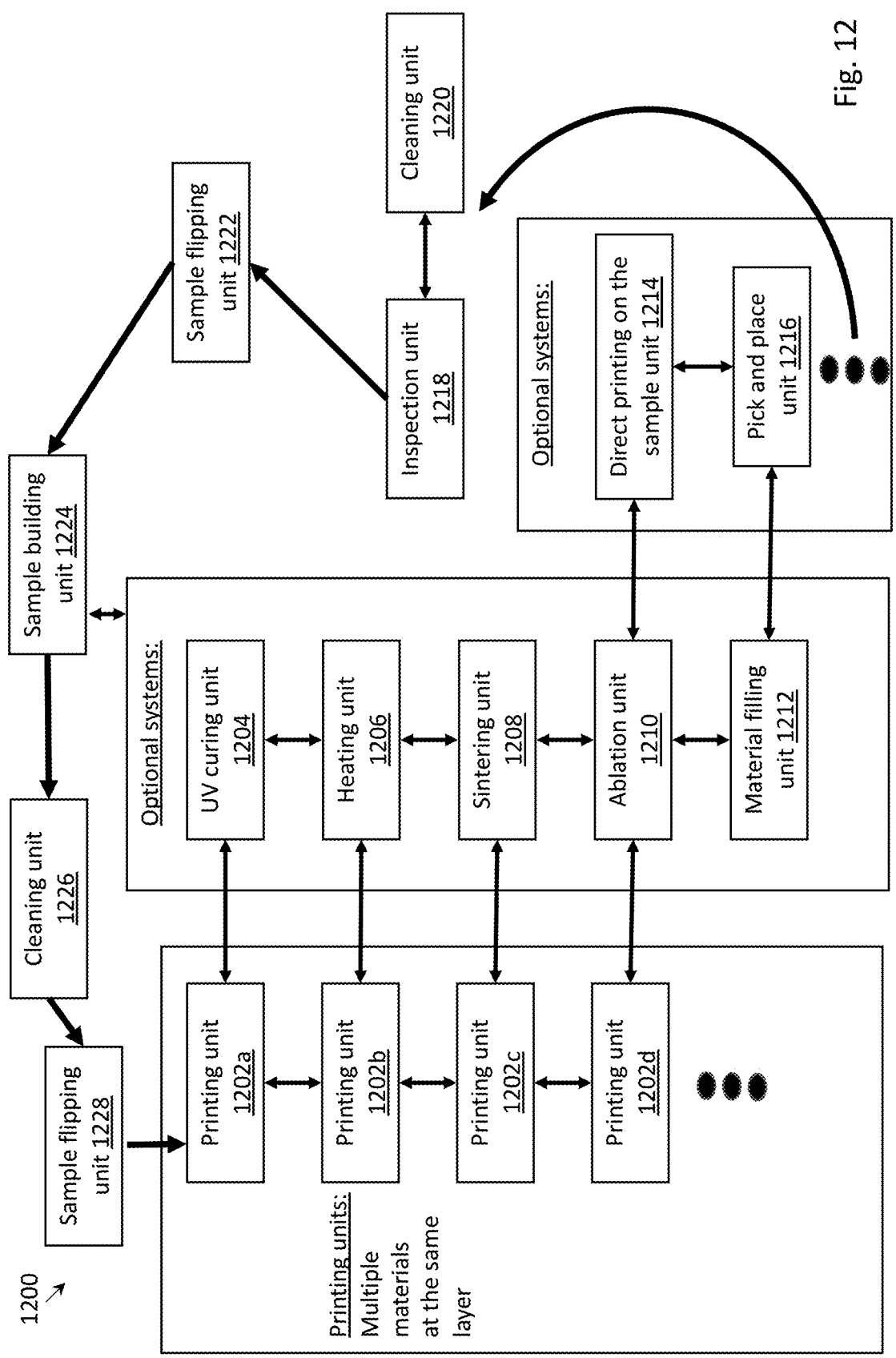

SYSTEMS AND METHODS FOR 3D PRINTING WITH VACUUM ASSISTED LASER PRINTING MACHINE

RELATED APPLICATIONS

This is a NONPROVISIONAL of, claims priority to, and incorporates by reference U.S. Provisional Application No. 62/706,212, filed 5 Aug. 2020.

FIELD OF THE INVENTION

The present invention relates to systems and methods for printing a viscous material, in which the printing and curing of the viscous material are performed sequentially and at different physical locations.

BACKGROUND

In conventional additive or three-dimensional ("3D") fabrication techniques, construction of a three-dimensional object is performed in a layer-by-layer manner. Layer formation is performed through solidification of photo curable resin under the action of visible or ultra violet ("UV") light irradiation.

Two main techniques are known: one in which new layers are formed at the top surface of the growing object; the other in which new layers are formed at the bottom surface of the growing object. If new layers are formed at the top surface of the growing object, then after each irradiation step the object under construction is lowered into the resin "pool," a new layer of resin is coated on top, and a new irradiation step takes place. An example of such a technique is given in Hull, U.S. Pat. No. 5,236,637. A disadvantage of such "top down" techniques is the need to submerge the growing object in a deep pool of liquid resin and reconstitute a precise overlayer of liquid resin.

If new layers are formed at the bottom of the growing object, then after each irradiation step, the object under construction must be separated from the bottom plate in the fabrication well. An example of such a technique is given in the above-mentioned Hull, U.S. Pat. No. 5,236,637. While such "bottom up" techniques hold the potential to eliminate the need for a deep well in which the object is submerged by instead lifting the object out of a relatively shallow well or pool, a problem with such "bottom up" fabrication techniques, as commercially implemented, is that extreme care must be taken, and additional mechanical elements employed, when separating the solidified layer from the bottom plate due to physical and chemical interactions therebetween. For example, in U.S. Pat. No. 7,438,846, an elastic separation layer is used to achieve "non-destructive" separation of solidified material at the bottom construction plane. Other approaches employ a sliding build plate, for example, U.S. Pat. No. 9,636,873. Such approaches introduce a mechanical step that may complicate the apparatus, slow the fabrication process, and/or potentially distort the product.

Continuous processes for producing a three-dimensional object are suggested at some length with respect to "top down" techniques in U.S. Pat. No. 7,892,474, and the best approach to this date is offered by WO 2014/126837. There, an interface between the first and second layers or zones of the same polymerizable liquid are formed. The first layer or zone (sometimes also referred to as a "dead zone") contains an inhibitor of polymerization (at least in a polymerization-inhibiting amount); in the second layer or zone, the inhibitor has been consumed (or has not otherwise been incorporated or penetrated therein) to the point where polymerization is no longer substantially inhibited. The first and second zones do not form a strict interface between one another, but rather there is a gradient of composition that can also be described as forming an interphase between them as opposed to a sharp interface, as the phases are miscible with one another, and further create a (partially or fully overlapping) gradient of polymerization therebetween (and also between the three-dimensional object being fabricated, and the build surface through which the polymerizable liquid is irradiated).

Although promising, this technique has several limitations. First, it can be used only for one material formulation at a time, limiting dramatically the physical properties of an article produced by this technique. The second limitation is the rate of the production, which is limited by the inhibitor used by the technique, the viscosity of the liquid phase, and the UV light source power. Another limitation is that the article is still immersed in a resin bath and it needs to be cleaned of residuals at the end of the fabrication process.

SUMMARY OF THE INVENTION

The present invention relates to systems and methods for printing a viscous material, in which the printing and the curing are done in a sequential way and not at the same place, creating a possibility to reduce dramatically the time of printing. In an initial stage, a viscous material is printed to an intermediate substrate and that substrate is moved sequentially to a vacuum chamber where the new layer is added to a sample by curing. Since this is a sequential procedure, a multiple number of printing units can be added to the sequence, enabling many different materials to be printed at the same layer and several post processes to increase speed, resolution, and diversity of materials of the same sample. The current invention provides a much faster way to produce a three-dimensional article than is possible using conventional processes by creating a next layer on a film at a high resolution and exposing it to a corresponding light source during contact between the film and a sample to produce the sample's next layer. Since this is a continuous sequence production, the rate of 3D object formation and its versatility are improved over those of conventional methods. Multiple materials can be introduced at each layer and no cleaning is needed at the end of the production process.

The present inventors have recognized that it is desirable to print 3D objects using versatile materials while still maintaining a high-speed production. To that end, the inventors have developed systems and methods that segregate the jetting process and the application process, thereby addressing jetting speed while avoiding limiting the process to a single material. In one embodiment of the invention, a vacuum assisted laser printing system includes an initial printing to an intermediate substrate and a secondary adhering and curing station to a final substrate. The system may include one or more imaging arrangements for monitoring and control of the various processes. Curing arrangements may also be included for the final product as well as intermediate materials and processes.

In some embodiments of the invention, the printing system includes a coating system that creates a uniform layer of a to-be-printed material on a substrate. Where present, the coating system may include a syringe of the to-be-printed material and an air or mechanical pump that drives the to-be-material from the syringe onto a donor or carrier substrate. The donor substrate is then moved towards and through a well-defined gap between rollers or knives to create a uniform layer of the to-be-printed material with a thickness that is defined by the gap. Alternatively, the coating system may include a screen-printing module where the to-be-printed material is coated on a screen or stencil of film with well-defined holes and, using a blade or a squeegee, the to-be-printed material is transferred to a substrate in a soft or hard engage. In still further embodiments of the invention, the coating system may include a dispenser or an inkjet head to print the material onto a substrate, a gravure or micro-gravure system, a slot-die system, or a roller coating system that coats a substrate with a highly uniform layer of the to-be-printed material. The coating system may be housed inside a closed cell with a controlled environment (cold or hot) to prevent evaporation of solvent from the to-be-printed material or to prevent material oxidation, thereby prolonging the pot life of the material. Also, the coating system may contain more than one material, thereby creating a possibility for printing plural materials onto the intermediate substrate in a controlled sequence and making it possible to print more than one material on the final substrate. Within the coating system, the donor substrate may be translatable, bidirectionally or otherwise, in a controlled manner, e.g., while opening a gap between coater rollers, creating the possibility for recoating the same area of the donor substrate with the to-be-printed material without contamination of the rollers and reducing or eliminating the amount of substrate consumed during the initial printing process, thereby preventing waste.

In various embodiments of the invention, the printed material may be high viscosity light cured resin, a solder paste or other metal paste(s) used for printed electronics, a metal paste or a ceramic paste, a highly viscous material, a wax material, a polymer material or a mix of a polymer and a monomer material, a sensitive low viscosity material, a material that can be cured by UV light or by heating, or a material that can be dried.

The printing process may use a laser-based system that contains a high frequency laser to enable jetting of the material from one substrate to another substrate. Either may use a laser assisted deposition/laser dispensing system rotated by 0-90 degrees or 90-180 degrees from a main axis of a gravitational field within which it is located, enabling simpler mechanics without reducing printing quality.

In some cases, the printing process may use an inkjet head system that enables jetting the material directly to the intermediate substrate, a dispenser head system that enables printing the material directly to the intermediate substrate, or an offset printer module, a gravure printing module, or another printer module that enables printing the material directly to the intermediate substrate. Alternatively, the printing process may use a screen-printing module in which the material is coated on a screen or stencil of film with well-defined holes and a blade or a squeegee employed to transfer the material to a substrate in a soft or hard engage, creating an array of dots on the substrate. In some embodiments of the invention, after printing to the intermediate substrate in the printing unit, the printed intermediate substrate may be further cured by UV light or dried by a heater and returned to the printing unit for a second (or additional) layer printing.

In some embodiments of the invention, the printing process can be done by a "Tetris like" approach. Using that approach, one coating cycle is used per several printing layers to maximize the material used. In this manner, all the material from the coating film is being consumed by several layers minimizing the waste of the material and the coating film and reducing printing time as well.

In some embodiments of the invention, the printing process can be followed by a film cleaning unit. The cleaning unit will enable easy recycling of excess material and easy recycling of the film. To that end, a roller with a knife or a sponge roller can be applied to the main film after the printing, or the main laser can be used to remove excess material from the film after printing.

In some embodiments of the invention, the printing unit includes a gap control unit configured to maintain a very well-defined gap between the donor substrate and the intermediate substrate. For example, the very well-defined gap between the coated substrate and the intermediate substrate may be maintained by a plane of three actuators at corners of a control unit that allows both translation and rotation, as mentioned in U.S. PGPUB 2005/0109734 A1, U.S. Pat. No. 6,122,036 A, WO 2016/198291, and EP 3,219,412 A1. Such actuators may be used at corners of a control unit for both the coated substrate and the intermediate substrate to allow both translation and rotation in two planes, where the two planes are independent of or riding on each other.

In another embodiment of the invention, the very well-defined gap between the donor substrate and the intermediate substrate is achieved by providing a fixed support below the intermediate substrate which is part of the coating system framework. Or, the very well-defined gap between the coated substrate and the intermediate substrate may be achieved by using a transparent solid substrate instead of a film as an intermediate substrate.

In another embodiment of the invention, the very well-defined gap between the donor substrate and the intermediate substrate is achieved by using a fixed coating system that moves only in the z direction and an intermediate substrate that can move only in the x and y directions of a plane that is connected directly to the fixed part, providing a fixed support to both ends of the system.

In some embodiments of the invention, the intermediate substrate may be a continuous transparent film substrate, a transparent film substrate coated by a metal layer or by a metal and a dielectric layer, or a transparent solid substrate.

In some embodiments of the invention, after printing the intermediate substrate is moved, by motors, from a one printing unit toward another printing unit. Thus, the intermediate substrate may be a continuous film substrate that, by rolling, can deliver the material printed at the first printing unit to other printing units collecting multiple materials at desired patterns and mixtures. Or, the intermediate substrate may be a transparent solid substrate that can deliver the material printed at the first printing unit to the other printing units by a robotic arm toward the end of creating a full image layer with multiple materials, with optional change(s) in direction.

In some embodiments of the invention, after printing the intermediate substrate is flipped to enable easier engagement with the sample.

In some embodiments of the invention, the intermediate substrate contains a release layer that enables a fast detaching from the sample and to avoid sticking of the intermediate substrate to the sample. To that end, a chemical or mechanical approach or both can be used. A flexible substrate or a film can be used for easy mechanical detachment and FEP, Teflon coat or silicone-based coats can be used for chemical detachment.

In some embodiments of the invention, during movement of the intermediate substrate between printing units the printed material is cured by UV light or dried by a heater. In addition, the printed image may be processed by an imaging system. Such an imaging system may be a microscope or a charge-coupled device (CCD) that takes a picture of the printed material on the intermediate substrate and measures the dots in two dimensions, with the measurement data subsequently being transferred to a cleaning unit to avoid adding a defective layer to the final substrate. Alternatively, the imaging system may be a three-dimensional (3D) microscope that takes a picture of the printed material dots on the intermediate substrate and measures the dots in three dimensions, with the measurement data subsequently being transferred to a cleaning unit to avoid adding a defective layer to the final substrate. In still further embodiments of the invention, the imaging system is two microscopes or CCDs arranged such that one can image the printed material dots on the intermediate substrate and measure the dots in two dimensions (e.g., length and width) while the other measures the dots in a third dimension (e.g., height), with all of the measurement data subsequently being transferred to a cleaning unit to avoid adding a defective layer to the final substrate. In any event, imaging systems may be included before and/or after the curing unit and may capture images from the intermediate substrate, the final substrate, or from both. In one embodiment of the invention, an imaging system at the curing unit may employ a mirror to obtain images from a surface of the intermediate substrate and/or a main laser channel printing unit to image both the material dimensions and a target area of the final substrate simultaneously.

In some embodiments of the invention, the curing unit may be a vacuum chamber that contains a sample holder, a curing unit and a very accurate z axis to control the engagement and disengagement of the intermediate substrate and the sample. The intensity of the vacuum will define the amount of bubbles that will entrapped inside the sample.

In some embodiments of the invention, some additional units can be added to the system. In some embodiments of the invention a laser sintering system can be added to sinter materials that can be sintered at high temperature. For example: sintering of metal particles within a metal paste that can be printed and sintered later.

In some embodiments of the invention, a laser ablation unit can be added after printing or after curing of the sample. The laser ablation unit can enhance the sample resolution of the printed layer after curing or be used for sample detachment after curing. The laser ablation can increase the printing resolution as a post printing process or as cleaning tool during printing before curing.

In some embodiments of the invention, a material filling unit can be added. A mold of material can be printed using UV curable materials and then a non-curable material such as epoxies, thermoplastics and metal or ceramic pastes can be filled inside the mold—layer by layer or every several layers. The filling material unit enables a versatile use of the system and increases the materials that can be used with the vacuum-assisted laser 3D printing machine almost endlessly.

A full system workflow can be as suggested below:
a. Several printing units: printing different types of materials on the same intermediate substrate that moves through all the stations one by one (in each station there is a substrate in some stage of printing to increase overall printing speed).
b. Additional units: the intermediate substrate can move from the printing units to complementary additional units between or after the stations.
c. Inspection and cleaning: each layer is checked before addition to the sample and if a defect is found the layer can be cleaned completely or fixed at an ablation unit.
d. Layer addition to the sample: adding the layer to the sample may be done by flipping the sample (but flipping is not mandatory and a sample that engages with the substrate from the top is another possibility).
e. Curing unit: the sample and the intermediate substrate are held close to each other during the curing (UV or thermal) and the addition of the material layer to the sample. A good practice to reduce entrapment of air bubbles inside the sample is to use a vacuum chamber.
f. Post process: the sample can be fixed after the addition of the layer by laser ablation. The sample can also be thermally cured before moving to the next layer. Another possibility is to add/jet material directly on the sample inside the vacuum chamber or in another post process unit.
g. Return to the beginning: the intermediate substrate can be flipped back to its original orientation (if required) and cleaned before starting the process from the beginning.

These and further embodiments of the invention are described in detail below.

BRIEF DESCRIPTION OF THE DRAWINGS

The present invention is illustrated by way of example, and not limitation, in the figures of the accompanying drawings, in which:

FIGS. 3a-3e illustrate alternative arrangements for a system configured in accordance with the schematic illustration shown in FIG. 2, in which FIG. 3a shows an example of such a system based on laser assisted deposition in a printing unit and a UV module, FIG. 3b illustrates the process of printing and sample building of a UV curable material, FIG. 3c illustrates the same process as FIG. 3b with printing on an opposite side of the intermediate substrate to avoid flipping of the substrate, FIG. 3d shows an example of such a system based on laser assisted deposition and a heating module, and FIG. 3e illustrates a fully cured layer that is released by a laser from the intermediate substrate.

FIGS. 6a and 6b illustrate examples of intermediate substrates, including a chemically inert substrate or a substrate that is coated with fluoro or silicone polymers, in accordance with some embodiments of the present invention.

FIGS. 7a and 7b illustrate examples of intermediate stations that can be used during printing. FIG. 7a illustrates an inspection unit, while FIG. 7b illustrates a substrate cleaning unit.

FIGS. 8a-8c illustrate aspects of using different intermediate stations: an additional curing system (FIG. 8a), an additional thermal curing unit (FIG. 8b), and an example of a curing station using an inert gas (FIG. 8c).

FIGS. 9a-9d illustrate aspects of using different intermediate stations: an additional sintering unit (FIG. 9a) or an ablation unit (FIG. 9b), and using those units to sinter or ablate materials on the intermediate substrate (FIG. 9c) or directly on the sample (FIG. 9d).

FIG. 12 illustrates a full workflow of printing using several printing units and several additional units before inspection of and cleaning the sample, flipping the sample, and curing and detachment of the sample.

DETAILED DESCRIPTION

Figure 1:
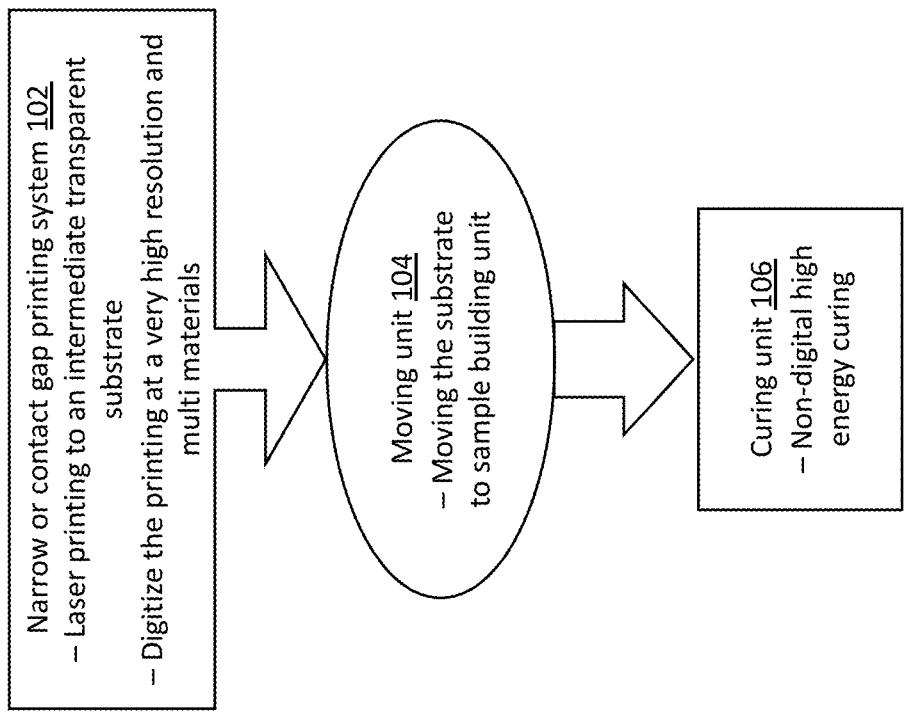
FIG. 1 illustrates, in a conceptual manner, a system configured in accordance with embodiments of the present invention which employs a narrow or contact gap printing system, post-printing processing and/or inspection, and a non-digital curing during contact to a sample to provide high resolution and high speed printing of viscous materials.

Before describing the invention in detail, it is helpful to refer to FIG. 1 that illustrates, in a conceptual manner, a system configured in accordance with embodiments of the present invention which employs a narrow or contact gap printing system, post-printing processing and/or inspection, and a non-digital curing during contact to a sample to provide high resolution and high speed printing of viscous materials. As further described below, the narrow or contact gap printing system 102 performs an initial printing of the viscous material to an intermediate substrate. As part of the preprinting processing and/or inspection, the intermediate substrate may be observed by one or more imaging arrangements for monitoring and control of the initial and subsequent printing processes. Then, after the intermediate substrate is moved by moving unit 104 to a sample building unit, the intermediate substrate may be employed as part of a curing unit 106 to transfer the viscous material to a final substrate. In one implementation of this two-step printing procedure, the viscous material is printed from more than one printing unit on the intermediate substrate, creating a multiple material layer that can be deposited on the final substrate (sample).

The first printing process may be a laser assisted deposition or other laser dispensing printing, where dots of the viscous material are ejected from a uniform layer thereof on a coated substrate (e.g., a donor substrate) onto (or into) the intermediate substrate using a high frequency laser. The jetting of the material is preferably conducted in a well-defined and robust way to minimize variations in dot sizes. To ensure the uniform coating of the viscous material onto the donor substrate, an optional coating system may be used to coat the donor substrate before the donor substrate is provided to the first printing unit at which the laser assisted deposition or other laser dispensing printing is performed. This coating system may be a traditional coating system such as a coating system based on a micro gravure or slot die coater or a roller coating system. Alternatively, the coating system may be a screen printing-based coating system, a dispenser, or an inkjet system. In still other embodiments, the coating system may be based on a syringe and gap system in which the viscous material is dispensed from a syringe to a donor substrate which then passes through a well-defined gap, e.g., formed by blade of other kind of barrier, or a pair of rollers or cylinders. After passing through the gap, a uniform layer of the viscous material will be present on the donor substrate and the laser assisted deposition/laser dispensing system can jet dots of material from the coated, donor substrate to the intermediate substrate. After providing the uniform layer of viscous material for printing in the first printing process, the donor substrate can be returned to the coating system (e.g., in a loop or by linear translation) for recoating by the coating system to create a new uniform coated layer on the donor substrate for the next printing by the first printing process. The donor substrate may be a transparent film or other substrate, with or without a metal (or other) coating.

Systems configured in accordance with embodiments of the present invention may be used for printing a wide variety of liquid and/or paste materials. However, the present invention provides particular benefits for the printing of highly viscous materials that cannot be printed well in high resolution by other methods. For example, systems configured in accordance with embodiments of the present invention find particular application in printing high viscosity UV cured polymers, solder pastes and other metal pastes, as well as polymers, like acrylics, epoxies, and urethane-based adhesives, pastes or waxes. The present invention may also be employed in connection with the printing of sensitive materials since a coated, donor substrate can be maintained in a controlled environment prior to the first printing process so as to avoid solvent evaporation or oxidation of the material to be printed.

The first printing process need not necessarily employ a laser assisted deposition/laser dispensing system. In some embodiments, the first printing process may employ a dispenser or an inkjet head, or it could employ conventional 2D printing techniques such as offset printing, gravure printing, or other printing techniques. The first printing process may also be performed using screen printing or a combination of these techniques.

The laser jet release system may include a high frequency laser arranged to scan the intermediate substrate in two dimensions to jet the material from the coated substrate to the intermediate substrate. Alternatively, a direct transfer system may be used in which the intermediate substrate engages the donor substrate directly to transfer the viscous material therebetween.

After printing to the intermediate substrate, the viscous material may be cured by UV or infra-red light provided by curing unit 106 or dried by a heater. The viscous material can also be sintered or ablated before moving the viscous material to the curing chamber of the curing unit 106.

Figure 2:
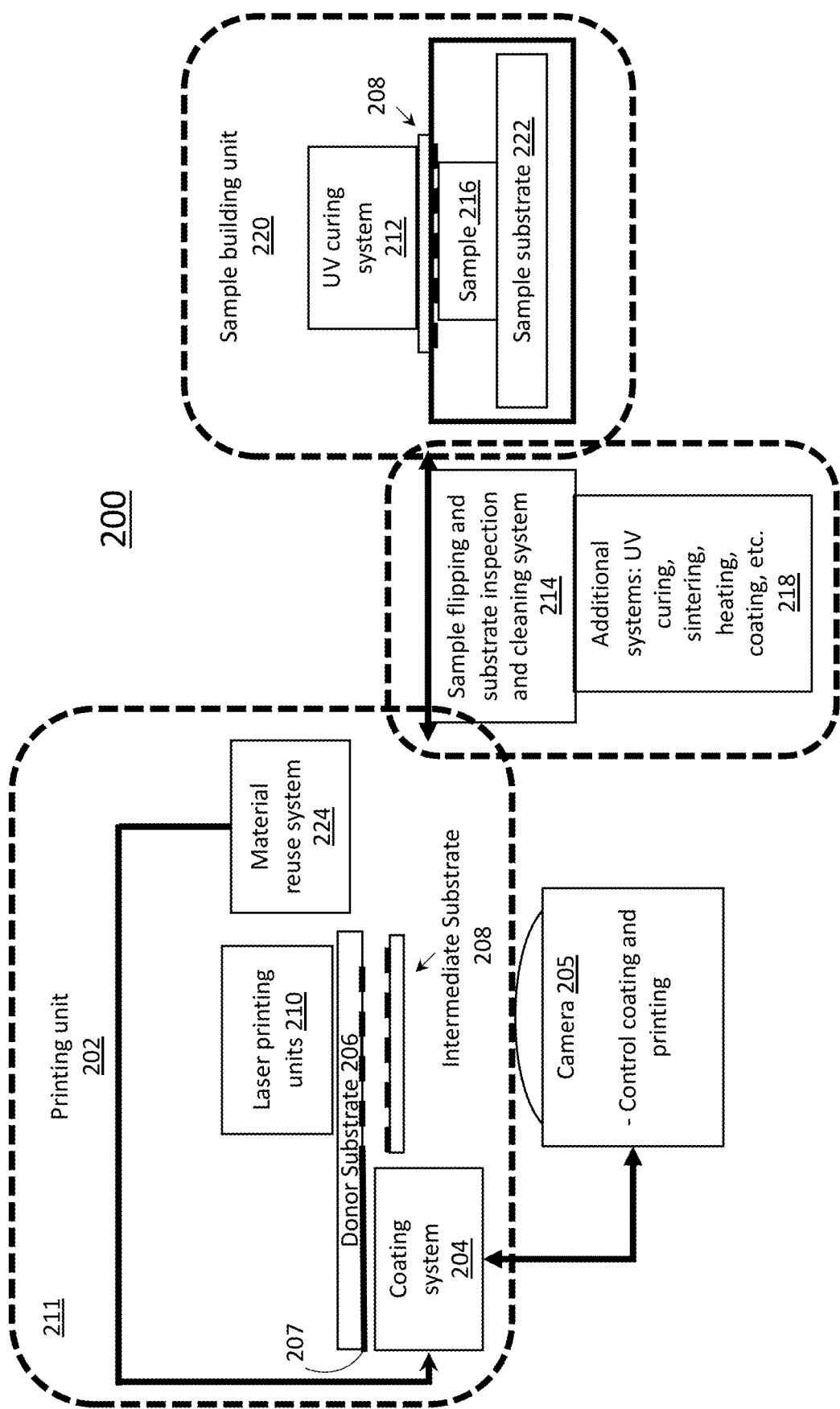
FIG. 2 illustrates schematically aspects of a system configured in accordance with the conceptual overview presented in FIG. 1.
Figure 3A:
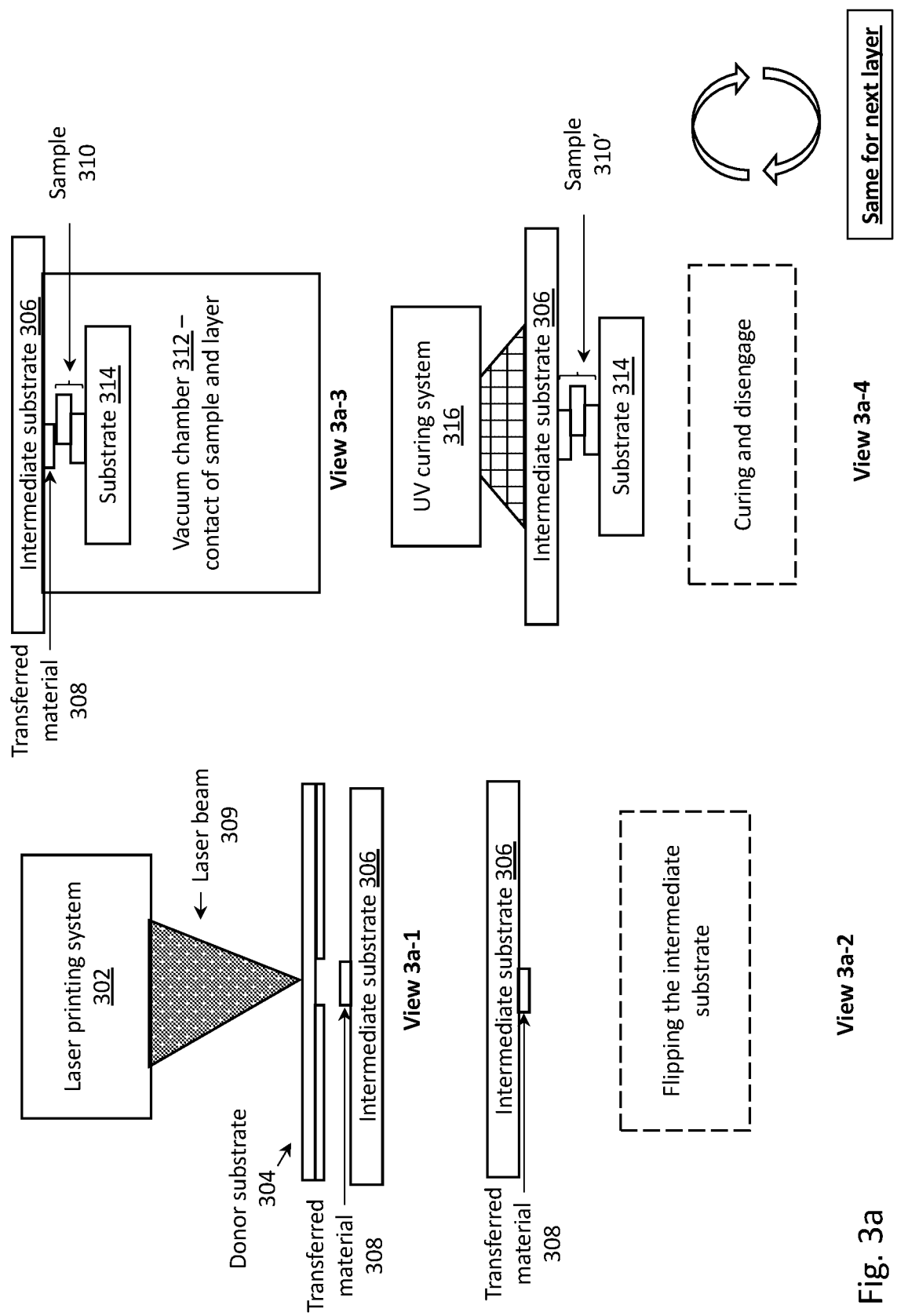

FIG. 2 illustrates schematically aspects of systems 200 configured in accordance with the conceptual overview presented in FIG. 1. Each of these systems segregate the viscous material jetting process from the application process, thereby addressing jetting failures while avoiding issues caused by conventional printing processes. The respective systems include one or more imaging arrangements for monitoring and control of the jetting and application processes. In FIG. 2, the printing system 202 includes a coating system 204 that creates a uniform layer of the to-be printed material 207 (e.g., a highly viscous material such as a polymeric material, a solder paste or other metal paste(s), a ceramic paste, a wax material or a mix of a polymer and a monomer material, or a sensitive low viscosity material) on a donor substrate 206.

In one embodiment of the invention (as illustrated further in FIG. 4), the coating system 204 includes a syringe of the to-be printed material 207 and an air or mechanical pump that drives the material from the syringe onto the donor substrate 206. The donor substrate 206 is then moved, using motors, toward a well-defined gap between rollers or knives to create a uniform layer of the to-be printed material with a thickness that is defined by the gap. In some embodiments of the invention, the donor substrate 206 can translate bidirectionally in a controlled manner, while opening the gap between the coater rollers, creating the possibility for recoating the same area of the donor substrate 206 with the to-be printed material without contamination to the rollers and reducing or eliminating the amount of donor substrate consumed during the initial printing process, thereby preventing waste.

In further embodiments, coating system 204 may include a screen-printing module where the donor substrate 206 is coated using a screen or stencil with well-defined holes, the viscous material being applied thereto using a blade or a squeegee, with the viscous material being later transferred to the donor substrate 206 in a soft or hard engage. Alternatively, coating system 204 may include a dispenser or an inkjet head to print the viscous material onto donor substrate 206. Or, the coating system 204 may be a gravure or micro-gravure system that coats the donor substrate 206 with a highly uniform layer of the to-be-printed material. In one embodiment of the invention, coating system 204 is a slot-die system that coats the donor substrate 206 with a highly uniform layer of the to-be-printed material. In another embodiment of the invention, coating system 204 is a roller coating system that coats donor substrate 206 with a highly uniform layer of the to-be-printed material. Although not shown in detail, the printing system 202 of FIG. 2 may also include a coating system 204 as part of a narrow gap/contact printing process, which forms the first printing process described above.

As shown in FIG. 2, in one embodiment of the invention, the narrow gap/contact or other first printing process, which may include one or more laser printing units 210, and optionally, a coating system 204, is housed inside a closed cell 211 with a controlled environment (cold or hot) to prevent evaporation of solvent from the to-be printed material or to prevent material oxidation, thereby prolonging the pot life of the material. In some embodiments of the invention, the coating system 204 contains more than one material, thereby creating a possibility for printing a plurality of materials onto an intermediate substrate 208 in a controlled sequence and making it possible to print more than one material on a final substrate. Camera 205 may be used to image intermediate substrate 208 and/or donor substrate 206, and the images may be used to control the coating of coating system 204 and/or the printing of laser printing unit(s) 210.

The printing unit 202 produces areas of the to-be printed material 207 on the intermediate substrate 208. In one embodiment of the invention, a continuous transparent film substrate is used as an intermediate substrate 208 for the system. Alternatively, a transparent film substrate coated by a metal layer or by a metal and a dielectric layer may be used as an intermediate substrate 208 for the system. Material on the donor substrate 206 that is not transferred to the intermediate substrate 208 may be removed from the donor substrate by a material reuse system 224 (e.g., that includes a blade that scrapes material from donor substrate 206, or a sponge that cleans donor substrate 206) for reuse in coating system 204.

The printing unit used in the narrow gap/contact or other first printing process may include a laser-based system 210 that contains a high frequency laser configured to jet portions of the layer of coated material from the donor substrate 206 to intermediate substrate 208. The laser assisted deposition/laser dispensing system 210 may be rotated by 0-90 degrees or 90-180 degrees from a main axis of a gravitational field within which it is located, enabling simpler mechanics without reducing printing quality.

Alternatively, where no coating system is used, the first (e.g., narrow gap/contact) printing process may employ an inkjet head system that enables jetting the to-be printed material 207 directly to the intermediate substrate 208. Alternatively, the first printing process may use a dispenser head system that enables printing the material directly to the intermediate substrate 208. Or, the first printing process may use an offset printer module, a gravure printing module, or any conventional printing technique to print the material directly to the intermediate substrate 208. For example, the first printing process may use a screen-printing module where the to-be printed material 207 is coated on a screen or stencil of film with well-defined holes and a blade or a squeegee is employed to transfer the material to the intermediate substrate 208 in a soft or hard engage, creating an array of printed material on the intermediate substrate 208.

In some embodiments of the invention, the printing unit 202 employed in the narrow gap printing process includes a very well-defined gap control unit between the donor substrate 206 and the intermediate substrate 208. In one instance, the very well-defined gap between the donor substrate 206 and the intermediate substrate 208 is maintained using a set of three actuators at corners of a control unit that allows both translation and rotation, as described in U.S. PGPUB 2005/0109734 A1, U.S. Pat. No. 6,122,036 A, WO 2016/198291, and EP 3,219,412 A1, incorporated herein by reference. Sets of three actuator units may be used at corners of a control unit for both the donor substrate 206 and the intermediate substrate 208 to allow both translation and rotation in both planes, wherein the two planes are independent of or riding on each other. Alternatively, the very well-defined gap between the donor substrate 206 and the intermediate substrate 208 may be maintained by providing a fixed support below the donor substrate and/or the intermediate substrate. Or, the very well-defined gap between the donor substrate 206 and the intermediate substrate 208 may be maintained by using a transparent solid substrate instead of a film as an intermediate substrate.

In another embodiment of the invention, the very well-defined gap between the donor substrate 206 and the intermediate substrate 208 is achieved by using a fixed coating system 204 that moves only in the z direction and an intermediate substrate 208 that can move only in the x and y directions of a plane that is connected directly to the fixed part, providing a fixed support to both ends of the system.

In some embodiments of the invention, after printing to the intermediate substrate 208 in the printing unit 202, the printed intermediate substrate 208 is returned to the first printing unit 202 for a second (or additional) layer printing of viscous material. In any event, after being printed with the viscous material (in the form of dots or other areas) the intermediate substrate 208 is moved from the printing unit 202 toward other printing units (not depicted) or the curing unit 212 housed in sample building unit 220. The intermediate substrate 208 may be moved by motors, e.g., where the intermediate substrate 208 is a film or similar substrate, or where the intermediate substrate 208 is a continuous film substrate, it may be moved by rollers to deliver the material printed at the printing unit 202 to the curing unit 212. In one embodiment of the invention, the intermediate substrate 208 is a transparent solid substrate that can deliver the material printed at the printing unit 202 to the curing unit 212 using a robotic arm, with optional change(s) in direction therebetween.

In some embodiments of the invention, after printing, the intermediate substrate 208 is flipped (by system 214) to enable easier engagement with the sample 216.

In some embodiments of the invention, the intermediate substrate 208 contains a release layer that enables a fast detaching of the sample 216 from the intermediate substrate 208 and to avoid sticking of the intermediate substrate 208 to the sample 216. To that end, a chemical or mechanical approach, or both, can be used. A flexible substrate or a film can be used for easy mechanical detachment and FEP, Teflon coat or silicone-based coats can be used for chemical detachment.

In some embodiments of the invention, during movement of the intermediate substrate 208 from the printing unit 202 to the curing unit 212, the material printed on the intermediate substrate 208 (which may be a material that can be cured by ultraviolet (UV) light or by heating) may be cured by UV light or dried by a heater (e.g., part of system 218). Furthermore, during the movement of the intermediate substrate 208 from the printing unit 202 to the curing unit 212, the material printed on the intermediate substrate 208 may be processed by an imaging system (e.g., part of system 214), cleaned by the cleaning unit (e.g., part of system 214), and/or ablated or sintered by additional units (e.g., part of system 218).

The imaging system (e.g., part of system 214) may be one or more microscopes, charge-coupled devices (CCD), and/or other imaging components that takes a picture (or pictures) of the printed material on the intermediate substrate 208 and measures the material in two or three dimensions. For example, the imaging system (e.g., part of system 214) may include two microscopes or CCDs arranged such that one can image the printed material on the intermediate substrate 208 and measure the material in two dimensions (e.g., length and width) while the other measures the material in a third dimension (e.g., height). This measurement data may be subsequently transferred to the cleaning unit (e.g., part of system 214) in order to ensure accurate deposition of the viscous material on the final substrate 222 (also called the "sample substrate"). For example, the optical or other imaging inspection may reveal that while many of the layers are suitable for transfer to the final substrate 222, some of the layers are unsuitable for transfer to the final substrate 222. A controller (not illustrated) having access to this data may then operate the cleaning unit 214 so as to clean unsuitable layers to the final substrate 222. Imaging systems (e.g., part of system 214) may be included before and/or after the material transfer area of curing unit 218 and may capture images from the intermediate substrate 208, the final substrate 222, or from both. In one embodiment of the invention, the imaging system (e.g., part of system 214) is positioned at the curing unit 212 and a mirror or other optical element employed to obtain images from the surface of the intermediate substrate and/or a laser channel of a printing unit may be used to image both the material dimensions and the final substrate print area simultaneously using the in-line inspection system (e.g., part of system 214).

In some embodiments of the invention, the inspection system (e.g., camera 205 and/or part of system 214) can be used to monitor and control the coating "on the fly" capturing the picture of the printed material directly on the intermediate substrate 208 and on the coated substrate 206 as well. The material coat area and thickness can be controlled by the inspection of the coated substrate and the intermediate substrate and such an inspection can be used to calibrate the dot size and coating gap. The coating gap can be changed and the effect on the dot size in combination with the laser spot and energy can control the overall voxel size and thickness very accurately.

In some embodiments of the invention, some additional units 218 can be added to the system. In some embodiments of the invention, a laser sintering system (e.g., part of system 218) can be added to sinter materials that can be sintered at high temperature (e.g., sintering of metal particles within a metal paste that can be printed and sintered later).

In some embodiments of the invention, a laser ablation unit can be added after printing or after curing to the sample 216. The laser ablation unit can enhance the sample resolution of the printed layer after curing or to be used for sample detachment after curing. The laser ablation can increase the printing resolution as a post printing process or as cleaning tool during printing before curing.

In some embodiments of the invention, a material filling unit can be added to the system. A mold of material can be printed using UV curable materials and then a non-curable material such as epoxies, thermoplastics and metal or ceramic pastes can be filled inside the mold—layer by layer or every several layers. The filling material unit enables a much more versatile use of the system and increases the materials that can be used with the vacuum-assisted laser 3D printing machine almost endlessly.

FIGS. 3a-3e illustrate alternative arrangements for a system configured in accordance with the schematic illustration shown in FIG. 2. Beginning with FIG. 3a, an example of such a system based on a laser assisted deposition printing unit and a UV module is shown. Within FIG. 3a, view 3a-1 illustrates a laser printing unit 302 situated above a donor substrate 304 (e.g., a coated film) and an intermediate substrate 306. The to-be-printed material 308 is transferred from the donor substrate 304 to the intermediate substrate 306 by the laser beam 309, e.g., by jetting.

Next, as shown in view 3a-2, an arm or other means is used to flip the intermediate substrate 306 to orient the side of the intermediate substrate 306 with the transferred material 308 to face away from laser printer system 302 and into proper alignment with the curing area.

Then, as shown in view 3a-3, intermediate substrate 306 is inserted into a vacuum chamber 312 where the intermediate substrate 306 (with the transferred material 308) is engaged with the sample 310 very accurately, creating a new layer on top of the sample 310. As depicted in view 3a-3, sample 310 may be anchored to substrate 314. View 3a-4 shows the transferred material 308 being cured by UV curing system 316, thereby adding a new layer to the sample 310. Immediately afterwards, a disengage movement is started and the sample 310' (with the newly cured layer) is moved away from the intermediate substrate 306, leaving a clean intermediate substrate 306 and a flat top surface on the intermediate substrate 306.

FIGS. 3b-3e illustrate further examples of several process configurations that can be used to create a layer on a sample in accordance with embodiments of the present invention. FIG. 3b illustrates a process using a UV curable material 320 that is printed onto the intermediate substrate 306. As depicted in views 3b-1 and 3b-2, the material 322 builds up on the intermediate substrate 306 to a height of several layers. As depicted in view 3b-3, the intermediate substrate 306 is flipped, and then, as depicted in views 3b-4 and 3b-5, the material 322 is oriented with respect to sample 324. As depicted in view 3b-6, UV light illumination system 326 is used to cure the material 322, and thereby secure material 322 to the sample 324 so as to form a more complete version of the sample 324'. As depicted in view 3b-7, the intermediate substrate 306 is then disconnected from the sample 324'.

FIG. 3c illustrates the same process as FIG. 3b, except that it employs a printing system directed opposite to the gravitational field in which it is operated, avoiding the step of flipping the intermediate substrate 306. Similar to the process in FIG. 3b, the intermediate substrate 306 is contacted to the sample 324 using UV light, and then the intermediate substrate 306 is disconnected from the sample 324'.

FIG. 3d illustrates a system similar to that of FIG. 3b, except that a heat-curable material 327 instead of a UV curable material 320 is used for the sample building. The process is similar, but the curing system now uses heat instead of UV light. As depicted in views 3d-1 and 3d-2, the heat-curable material 328 is built up on the intermediate substrate 306 to a height of several layers. Then, as depicted in view 3d-3, the intermediate substrate 306 is flipped, and as depicted in views 3d-4 and 3d-5, the material 328 is oriented with respect to sample 324. As depicted in view 3d-6, a heating system 330 is used to cure the heat-curable material 328, and secure heat-curable material 328 to the sample 324 so as to form a more complete version of sample 324'. Finally, as depicted in view 3d-7, the intermediate substrate 306 is disconnected from the sample 324'.

FIG. 3e illustrates a system similar to that of FIG. 3b, and further illustrates disconnecting the intermediate substrate 306 from the sample 324' using laser 332 from laser system 334. The laser 332 is used to etch the top surface of the intermediate substrate 306 and disconnect the sample 324' from the intermediate substrate 306. The same laser 332 can also be used to sinter or to ablate features on the sample 324'.

Figure 4:
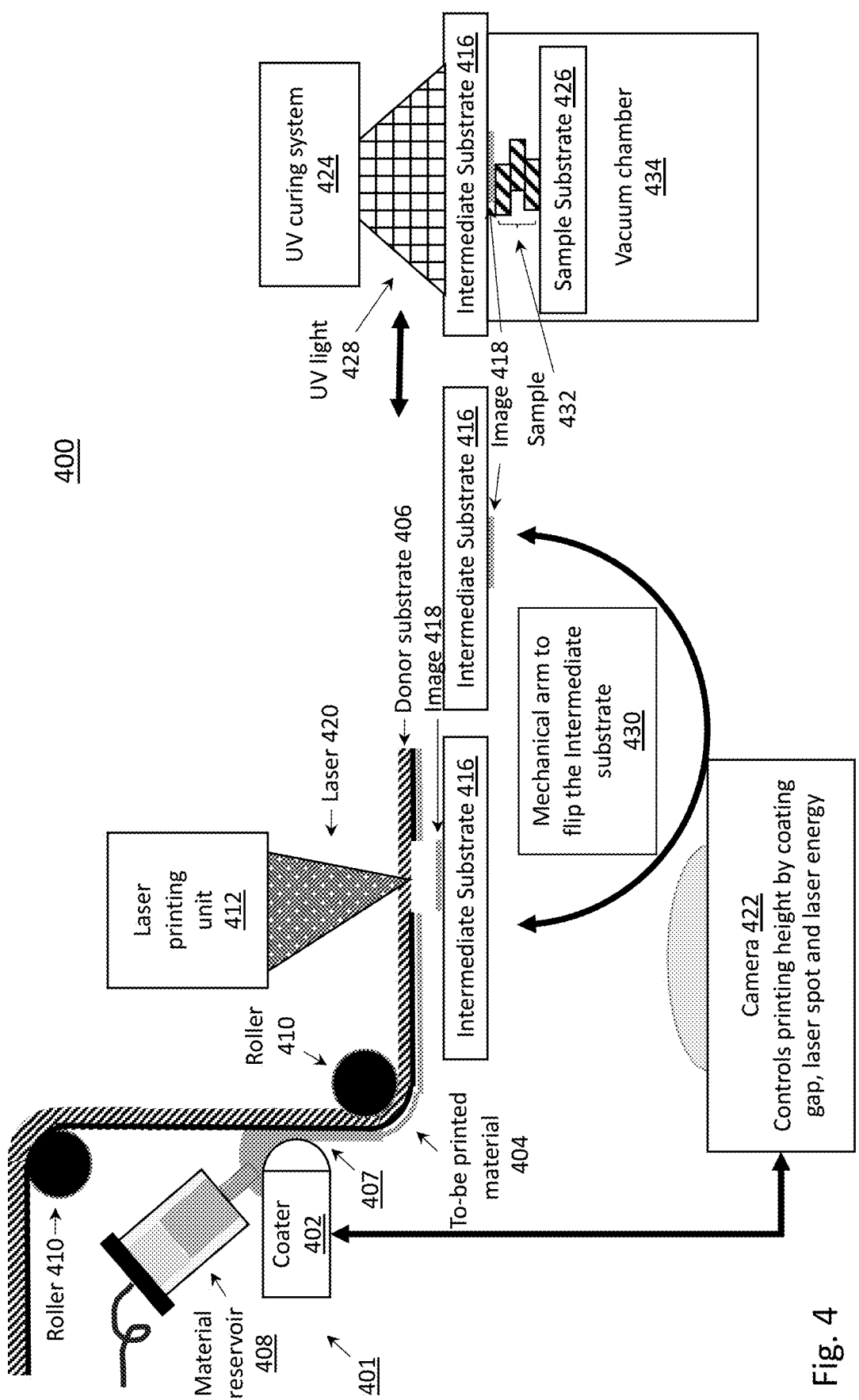
FIG. 4 illustrates the printing of a uniform film by placing a material on a film substrate by a syringe and passing the material through a well-defined gap to create a uniform layer, flipping the substrate, and curing the layer, in accordance with some embodiments of the present invention.

FIG. 4 illustrates one example of a system 400 configured in accordance with an embodiment of the present invention. In particular, system 400 includes a coating system 401 (which may include reservoir 408, coater 402, etc.) that creates a uniform layer of the to-be printed material 404 on a donor substrate 406 using an air or mechanical pump (not shown) to drive the material from a reservoir 408, e.g., a syringe, onto the donor substrate 406. The donor substrate 406 is then moved, using rollers 410 or gears, toward a well-defined gap 407 between rollers or knives to create a uniform layer of the to-be printed material 404 on the donor substrate 406 with a thickness that is defined by the gap 407.

The system also includes a laser printing unit 412 configured to produce an image 418 using the to-be printed material 404 on the intermediate substrate 416. In this example, the donor substrate 406 may be a transparent film and the laser printing unit 412 includes a laser module that contains a high frequency laser arranged to jet portions of the layer of coated material 404 from the donor substrate 406 to form image 418 on intermediate substrate 416 by focusing a laser beam 420 onto the interface between the layer of to-be printed material 404 and the donor substrate 406. The incident laser beam 420 causes local heating and high local pressure which drives jetting of the to-be printed material 404 onto the intermediate substrate 416. After printing the image 418 to the intermediate substrate 416 in the laser printing unit 412, the printed intermediate substrate 416 can be returned for a second (or additional) layer printing of material by reversing the direction of rollers 410 or gears or continuing the movement of intermediate substrate 416 through the coating system in a loop-like process.

Alternatively, the donor substrate 406 may be a screen or grid in which the to-be printed material 404 is introduced into holes of the screen by coater 402, which may be a roller or blade. In such cases, the incident laser beam 420 from the laser module 412 causes the to-be printed material 404 to be displaced from the holes in the screen onto the intermediate substrate 416.

The coating and printing process can be accompanied by a camera 422 that checks the area of coated material and can calibrate (e.g., via a feedback system that includes a controller that adjusts the gap width) the coating gap 407 to control the coated material thickness very accurately. The same camera 422 can inspect the printing process and calibrate (again via the controller) the energy and spot size of laser 420 to overcome some of the variation in the coating thickness and to control the dot size and voxel size.

Once the image 418 is printed on the intermediate substrate 416, the image 418 is moved to the next station, e.g., by moving the intermediate substrate 416 using rollers or gears, toward another printing unit or other intermediate units or the curing unit 424. Although not illustrated in this drawing, the intermediate substrate 416 may be a film substrate that is moved in a continuous loop-like fashion so that an image of material may be printed thereon at the printing unit 412, subsequently transferred to the final substrate 426 at the curing unit 424, and the now bare intermediate substrate 416 returned to the transfer area of the first printing unit 412 to receive a new image of material.

During movement of the intermediate substrate 416 from the printing unit 412 to the curing unit 424, the image 418 of material may be cured by UV light (not depicted) or dried by a heater (not depicted). Furthermore, during the movement of the intermediate substrate 416 from the printing unit 412 to the curing unit 424, the dots of material printed on the intermediate substrate may be processed by an imaging system 422 that includes one or more 3D and/or 2D imaging components that take pictures of the printed image of material and measure the image in two dimensions or three dimensions. This measurement data may be used by the cleaning unit (not depicted) in order to remove defective layers and also by the curing unit 424 to ensure accurate deposition of the material on the final substrate 426.

The movement of the intermediate substrate 416 from the printing unit(s) 412 to the curing unit 424 conveniently can be done by flipping the intermediate substrate using a mechanical arm 430. As a result, the printing and other supplementary processes are done facing up (assisted by the gravitational field) and the addition of the image 418 to the sample 432 is done facing down again assisted by the gravitational field. However, this is only a good practice and not a limitation, and both the printing and the attachment to the sample 432 can be performed opposite to the gravitational field or in other orientations.

The curing unit 424 may include a vacuum chamber 434 to enable the curing in a controlled environment and may also contain a UV or visible light source that can cure the full image using UV light 428 in one prolonged exposure. The intermediate substrate 416 is placed in the vacuum chamber 434 and the sample 432 is moved in three directions toward the intermediate substrate 416 in a very accurate manner. After engaging, the UV light source of UV curing system 424 is used to cure the layer on top of the sample 432, creating a very smooth and flat top surface on the sample 432. The final step is a disengagement of the sample 432 (with the cured material attached thereto) from the intermediate substrate 416, which cleans the intermediate substrate 416 as a convenient byproduct.

An alternative arrangement of the curing unit 424 may include a laser module (not depicted) with an in-line inspection unit (not depicted). As the intermediate substrate 416 is moved to a target area of the curing unit 424, the laser module is activated to emit a laser beam incident on the intermediate substrate 416 in order to deliver the material 418 printed at the printing unit(s) 412 to the final substrate 426 (also called "sample substrate"). The in-line inspection unit positioned at the curing unit 424 includes a mirror or other optical element(s) employed to obtain images from the surface of the intermediate substrate 416 to assist in an alignment of the final substrate 426 below the target area via a stage configured to move in two or three dimensions, as well as to help synchronize the pulsing of the laser module at times when the image of material 418 on the intermediate substrate 416 is in the target area. In some embodiments of the invention, the laser module of the curing unit 424 may be configured to scan the laser beam in a raster-like pattern over the intermediate substrate 416 as it passes through a target area, releasing the image of material 418 onto the final substrate 426. The material can go through a UV curing system and/or a drying system on its way to the curing unit, and/or UV curing and/or drying can be used after the material is printed on the final substrate 426.

In an alternative arrangement of the printing unit, system 400 includes a coating system 401, in which the to-be printed material 404 is driven from a reservoir 408, e.g., a syringe, using an air or mechanical pump (not shown) onto a roller. The material layer on the roller is kept uniform in thickness using one or more knives displaced a defined distance above the surface of roller. The roller may be dimpled or otherwise formed with recesses to contain defined amounts of the material to be printed, which amounts are transferred to a printing roller as the two rollers contact one another in a material transfer area. Alternatively, the roller may have a screen or grid-like surface with holes into which the material is introduced. The roller may contact the screen, effecting transfer of the material thereto. As the roller completes its rotation through a printing area, it transfers the material in the form of an image 418 onto the intermediate substrate 416. After the material is transferred from the roller, that roller passes through an inspection area and any remaining material may be removed using knives or other instruments prior to application of a new material layer. The remaining elements of the system are as described above with respect to FIG. 4.

In another embodiment of the present invention, a coating system 401 creates a uniform layer of the to-be printed material 404 on a donor substrate 406, for example using one of the techniques described above. A first printing unit 412 then prints the material from the uniform layer of the to-be printed material 404 on donor substrate 406 onto the intermediate substrate 416. In this example, a very well-defined gap may be maintained between the coated donor substrate 406 and the intermediate substrate 416 by the use of a fixed support below the intermediate substrate 416 in the vicinity of the printing unit 412. Remaining elements of the system are as described above with respect to FIG. 4.

As noted above, the intermediate substrate 416 can be a film but in other instances it may be a transparent solid substrate to ensure a better registration and synchronization between the first printing unit 412 and second printing unit 424 (also called the UV curing system). FIG. 4 shows printing from a coated donor substrate 406 onto a transparent solid intermediate substrate 416 that is then flipped to create a target for a second printing unit (i.e., UV curing system 424 may be called a printing unit) where the transparent solid intermediate substrate 416 is used for printing the image 418 onto the final substrate 426.

Figure 5:
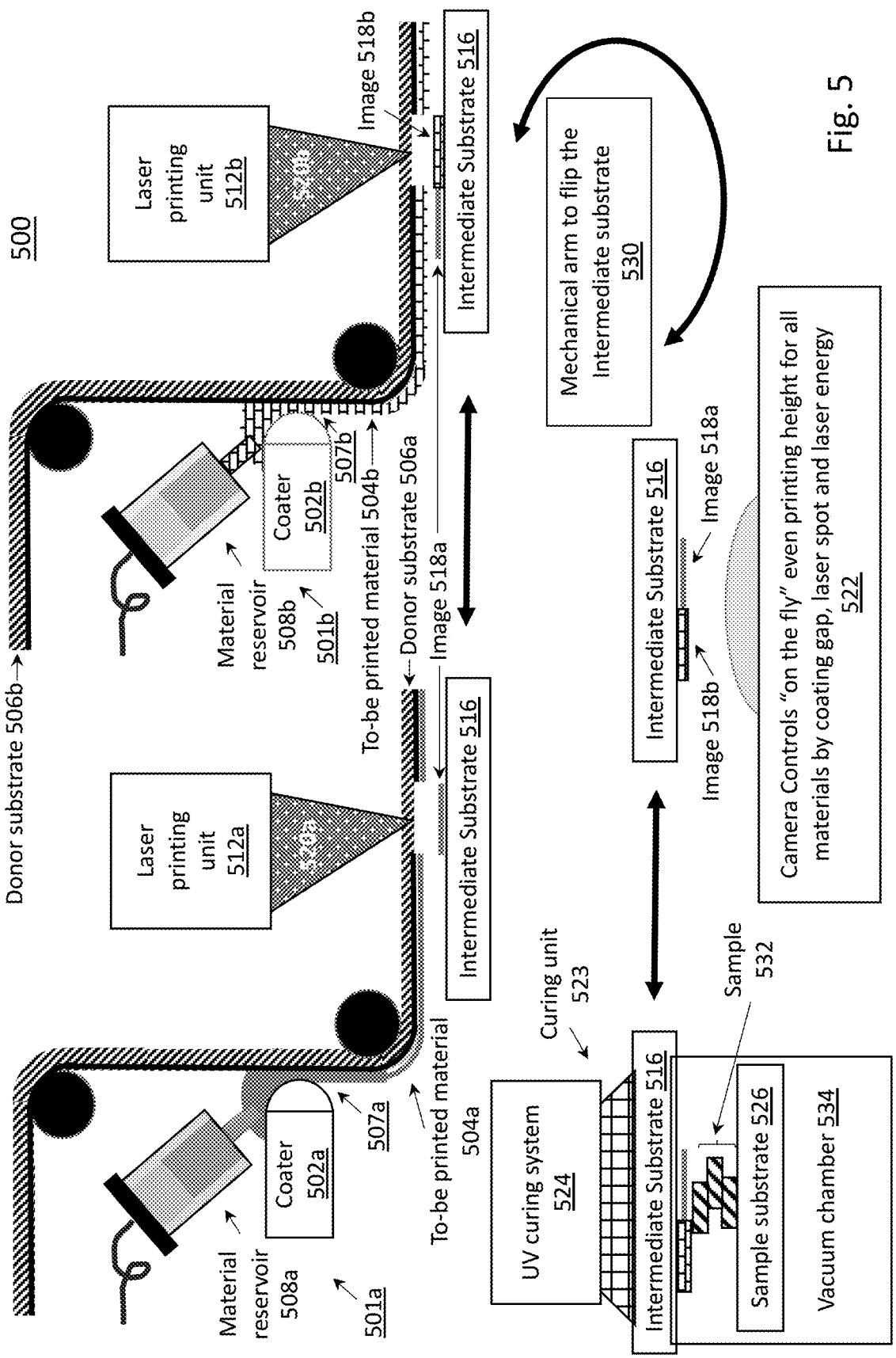
FIG. 5 illustrates an example of printing multiple materials to the same layer, in accordance with some embodiments of the present invention.

FIG. 5 illustrates an example of a system 500 having multiple printing units to create a multi-material sample. Every printing unit 512a, 512b has its own coating system 501a, 501b that includes a coater 502a, 502b, material reservoir 508a, 508b (e.g., syringe) of a respective to-be printed material 504a, 504b and an air or mechanical pump that drives the materials onto respective donor substrates 506a, 506b. The donor substrate 506a is first moved, using motors, rollers, etc., toward a well-defined gap 507a between rollers or knives of the coating system 501a, to create a uniform layer of to-be printed material 504a with a thickness that is defined by the gap 507a. When the to-be printed material 504a reaches the target area for the current material, the laser 520a of the current station 512a jets the material image 518a of the current material from the donor substrate 506a to the intermediate substrate 516. The intermediate substrate 516 is then moved, by motors, rollers, robotic arm, etc., to another printing unit 512b where a different image 518b is added to the intermediate substrate 516 by a similar process using laser 520b. Laser units 512a and 512b may be the same laser unit with lasers 520a and 520b being separate laser beams produced by an optical arrangement that produces multiple laser beams from a single laser unit. Such an arrangement may include beam splitters, mirrors, lenses, and one or more masks to ensure that only one laser beam is incident on a donor substrate at a time. The coating and printing process can be repeated as many times as needed, depending on the materials chosen by the user. An example of that kind of repeated process is the use of several colors and several materials with different properties. A full color sample with different mechanical properties at different ends of the sample can be designed and manufactured in that way.

The coating and printing process of each unit can be accompanied by a camera 522 (which may include multiple imaging stations for one or more coating and printing units) that checks the area of coated material and can calibrate the respective coating gaps 507a, 507b to control the coated material thicknesses very accurately. The same camera 522 can inspect the printing process and calibrate the laser energies and spot sizes to overcome some of the variations in the coating thicknesses and to control the dot sizes, voxel sizes and layer thicknesses of each material, ensuring that there will be no variations in the overall thickness of the layer on the intermediate substrate in different areas and/or different materials.

After moving between the different printing units, the intermediate substrate 516 may be transported to different additional systems (not shown), flipped if desired by mechanical arm 530, and moved to the curing unit 523. In the example shown in FIG. 5, the curing unit 523 contains a vacuum chamber 534 with a sample holder 526 (also called a sample substrate) and a UV curing system 524. Similar to the system described above in FIG. 4, the sample 532 may be moved in three directions toward the intermediate substrate 516 very accurately. After engaging, the UV light source of UV curing system 524 is used to cure the layer on top of the sample 532, creating a very smooth and flat top surface on the sample 532.

FIG. 6a illustrates an example of a transparent inert (intermediate) substrate 602 that is configured in accordance with the present invention and includes a substrate material that prevents the printed material both before and after the curing from adhering to the transparent inert substrate. The transparent inert substrate can be for example polytetrafluoroethylene (PTFE), fluorinated ethylene propylene (FEP), poly(fluorenylene ethynylene (PFE) or silicone based materials—materials with a very good non-stick properties, that will allow an easy detachment of the printed material from the transparent inert substrate and an easy transfer of the printed material to the sample. The intermediate substrate can also be some other material that is transparent to ultraviolet (UV) light, such as glass or plastic (e.g., polypropylene (PP) or polyethylene terephthalate (PET)) and can also be ceramics like ZnO or indium tin oxide ("ITO"). The intermediate substrate can be a rigid one, but it is more convenient to have a flexible intermediate substrate, because the flexibility can improve the detachment of the intermediate substrate from the cured layer of the sample. It is possible to combine those two properties together into a non-stick and flexible substrate and there are only two limitations to such a substrate—UV light transparency and prolonged working times. It is noted that there are many materials for which very thin film thereof can provide the properties of UV light transparency and an easy detachment of the cured material, but such thin films could fail after several printing cycles. Therefore, a good compromise between mechanical, chemical, and optical properties is needed to arrive at the right intermediate substrate.

As depicted in FIG. 6b, another way to meet the multiple requirements for the intermediate substrate is to choose a substrate 606 with good mechanical properties and optical transparency (such as glass) and to coat the substrate with a non-stick coat 604, like one of the above materials or any other, for example a material like Parylene, Gentoo™ or similar materials.

In yet another embodiment of the invention, the intermediate substrate can make use of some mechanical mechanisms to detach the cured layer from the intermediate substrate. For example, a vibration module can be used to enhance the detachment by facilitating the movement of the two surfaces that form the interface between the intermediate substrate and the cured layer. Another way is to use a transparent piezoelectric material like polyvinylidene difluoride (PVDF) with a coating of transparent electrode like ITO. The piezoelectric substrate can change its dimensions upon the application of an electrical field. More specifically, the intermediate substrate can detach from the cured layer of the sample in a gentle manner with an incremental increase of voltage.

In yet another embodiment of the invention, the intermediate substrate can make use of some other mechanical ways to detach the cured layer from the intermediate substrate. For example, the surface of the intermediate substrate can be a porous material. As a result of the porous material, the printed material can be prevented from curing near the surface of the intermediate substrate by supplying air to the topcoat during UV curing. The presence of air inhibits the curing process in the upper most microns, thereby preventing the cured material from sticking to the intermediate substrate.

In yet another embodiment of the invention, the intermediate substrate can make use of some other mechanical ways to facilitate the detachment of the cured layer from the intermediate substrate. For example, if the intermediate substrate is flexible, some suction can be applied directly to the intermediate substrate to enhance the detachment of the cured layer from the intermediate substrate.

Figure 6C:
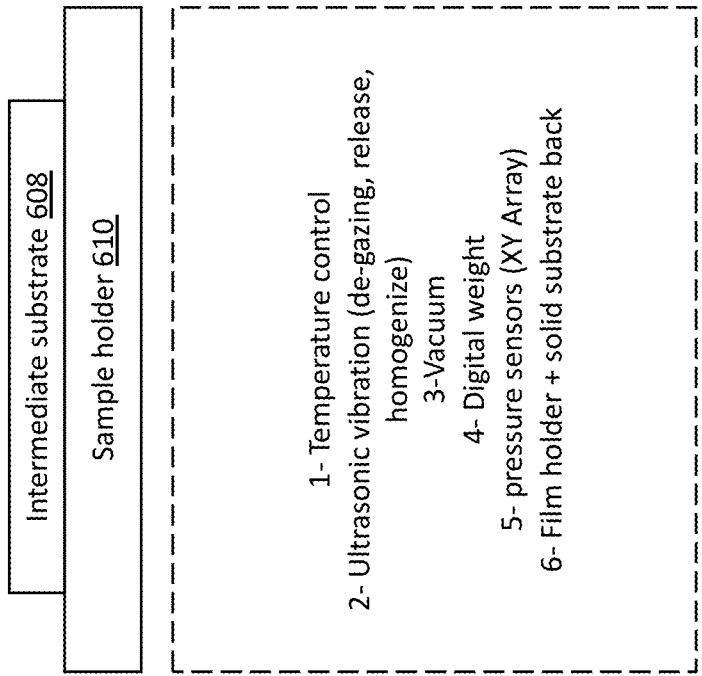
FIG. 6c illustrates another embodiment of the invention, in which the intermediate substrate is held by a functional holder to enhance its performance.

FIG. 6c illustrates another embodiment of the invention in which the intermediate substrate 608 is held by a functional holder 610 (also called a sample holder) to enhance its performance. In some embodiments of the current invention, the sample holder 610 can have a temperature control surface that can freeze the material or heat cure the material on the way to the sample building unit.

In some embodiments of the current invention, the sample holder 610 can have an ultrasonic vibration unit that will de-gas or homogenize the printed material or aid with the release of the intermediate substrate 608 from the cured layer of the sample in the sample building unit.

In some embodiments of the current invention, the sample holder 610 can have a vacuum holder to aid with the release of the intermediate substrate 608 from the cured layer of the sample in the sample building unit.

In some embodiments of the current invention, the sample holder 610 can have a digital weight to control the voxel size during the printing process.

In some embodiments of the current invention, the sample holder 610 can have an array of pressure sensors to control the contact of the intermediate substrate 608 and the sample in the sample building unit.

In some embodiments of the current invention, the sample holder 610 can be a solid substrate that is pressed against a thin film to aid with the release of the intermediate substrate 608 from the cured layer of the sample in the sample building unit.

FIGS. 7a, 7b, 8a-8c, 9a-9d, 10a, 10b, 11a and 11b illustrate different additional units that can be used to improve the print quality. FIG. 7a illustrates an inspection unit 702.

To enhance the jetting placement and resolution during printing, an imaging system 702 (also called an inspection unit) can be added to monitor the dimensions and placement of the printed image 706 on the intermediate substrate 704 and on the sample. To that end, one or more imaging systems 702 can be added both for monitoring the intermediate substrate 704 and for monitoring the printed image 706. The imaging system 702 for the intermediate substrate 704 can use a CCD, a microscope, or a 3D microscope and computer software to monitor the printed image 706 on the intermediate substrate plane and/or the height of the printed image 706 at an angle perpendicular to the intermediate substrate plane. The monitoring can also be done before and/or after the curing step by UV curing unit 712. The same imaging system 702 can be used to monitor the printed image 706 on the intermediate substrate 704 from the top and/or from the side. The different imaging solutions are intended to increase the placement success rate and to reduce the need for rework, creating highly reliable and reproducible results.

An inspection unit 702 can also use a main laser channel for imaging the solid or film substrate in accordance with some embodiments of the present invention. In this example, an image is printed on a solid intermediate substrate and a camera is used to scan the image via the main laser channel. Alternatively, the camera may be offset from the main laser channel and a semitransparent mirror inserted therein to reflect images towards the camera. Imaging of this kind may be used to ensure optimal placements of the material onto the sample. The same imaging system can be used to monitor the material on the sample from top and/or from the side.

In the case that an error is detected by the inspection unit 702 on the intermediate substrate 704, in accordance with some embodiments of the present invention, the intermediate substrate 704 can be cleaned in the substrate cleaning unit 708. The cleaning unit 708 may include a sacrificial substrate 710 that will collect the printed image 706 (now considered an un-wanted layer) at a direct touch to the surface of the un-wanted layer 706, as depicted in FIG. 7b. During the engagement between the sacrificial substrate 710 and the intermediate substrate 704, a UV light from UV curing unit 712 can be used to cure the printed image directly to the sacrificial substrate 710. A new layer will be accumulated on the sacrificial substrate 710 and the intermediate substrate 704 will be cleaned and returned to the first printing unit to collect a new layer.

Another approach to clean the intermediate substrate can use a roller with a knife. In that example, the material from the substrate is moving to the roller and cleaned from the roller by the knife. For that process, two additional tools can be added. One is a carrier liquid in a reservoir that will continuously wet the roller with a solvent like ethanol to enhance the surface cleaning, and the other is an air knife that can dry the surface after the cleaning.

In some embodiments of the current invention, a speed cure or a semi-cure process is needed. To meet that need, an additional curing system outside the main curing system can be added. The curing system can be a UV curing system 802 (FIG. 8a) or a thermal curing system 803 (FIG. 8b).

Figure 8C:
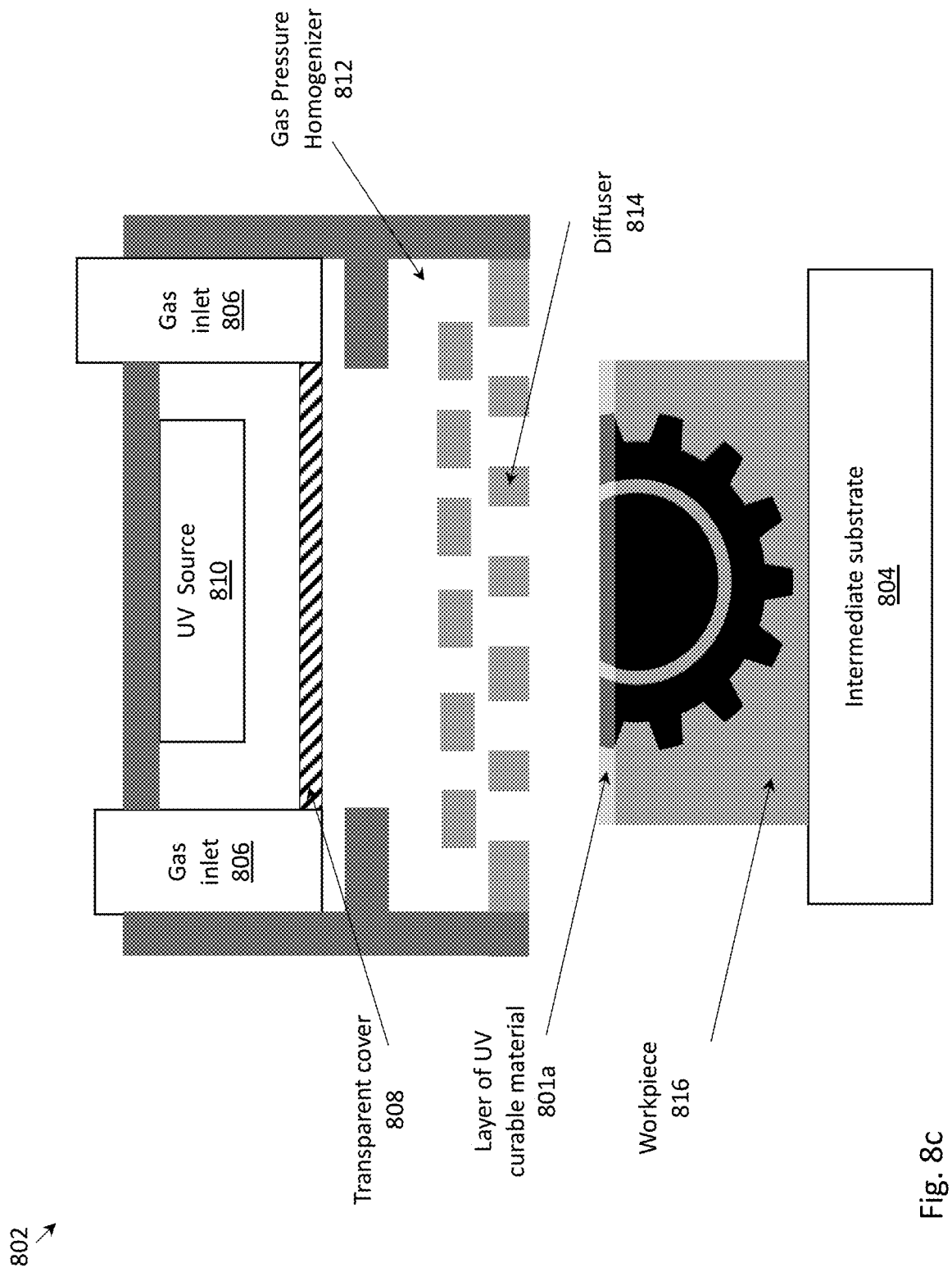

FIGS. 8a and 8c illustrate a UV curing system 802 for which the curing of a layer of UV curable material 801a that is carried on intermediate substrate 804 can be performed in an inert gas atmosphere. In one embodiment of the present invention, the UV curing system 802 is equipped with a gas diffusion system. A transparent cover 808 is disposed between the UV light source 810 and the gas diffusion system. The gas flows into the gas diffusion system from gas inlets 806 and out through a diffuser 814 at the bottom of the system. A gas pressure homogenizer 812 is used to ensure constant pressure throughout the system. The diffuser 814 is made of a transparent or diffuse material to allow UV light to pass through the diffuser 814 onto a workpiece 816, and in particular, onto the layer of UV curable material 801a disposed thereon. The diffuser 814 consists of an array of micro-holes. The small diameter of the micro holes allows for a closed-packed array thereof so that the gas is evenly distributed throughout the curing area. The small diameter of the micro-holes also means that a larger area of the surface of the diffuser 814 is free of holes, making its optical properties more homogenous. This ensures more even light distribution. Of course, other arrangements and sizing of the micro-holes may be employed so as to optimize gas distribution and light distribution throughout the curing area. The micro holes are covered with "bridges" of the material of which the diffuser is made. The bridges ensure that all light passing through the diffuser must pass through some region of the transparent material, further improving the light distribution.

FIG. 8b illustrates a thermal curing system 803. In some embodiments of the present invention, a non-UV curable material can be used for the printing. Therefore, in some cases, the non-UV curable material may be dried, while in other cases, the non-UV curable material may be cured by thermal curing. The above material is then printed to the intermediate substrate 804 to form a layer of non-UV curable material 801b and moved with motors to the heating unit 803. There, the layer of non-UV curable material 801b is subject to heating and cured or dried.

More generally, a layer that contains both UV curing materials and thermal materials can be first UV cured and then thermally cured to produce a fully cured layer. In such case, the heating process can be performed in-line with the UV curing, before or after the UV curing of other materials on the intermediate substrate 804. In the next stage, on the same layer, a UV curable material can be printed to create an adhesion layer to the already cured first layer. By means of the adhesion layer, thermally curable materials can also be added to the sample when the UV material (i.e., the adhesion layer) is cured in the main curing unit and attached directly to the sample.

In some embodiments of the current invention, additional processing of the printed material is very important. For instance, after printing the image, a metal paste that contains metal particles can be deposited onto the image and sintered to create a continuous conductive layer on top of the printed image. The same material after sintering can be ablated in another station in order to increase the image resolution. In order to perform such additional processing, an additional sintering and ablation system could be added as additional units.

In some embodiments of the present invention, material sintering has an important role in the overall functionality of the printed object. FIG. 9a illustrates a sintering unit 900. In a sintering process, a laser beam is focused onto a spot of the printed material 902, and as a result, a significant heating process occurs very locally. The local heating of the printed material 902 can increase the temperature locally to hundreds of degrees and even more in a very fast and efficient manner. When a particle that absorbs that energy reaches a phase transition temperature of the material, that particle and another nearby particle can melt together, creating a first building block of a line structure. In the case of metals, the particles after a successful sintering process will create a conduction line in the direction of the sintering. In ceramics, a ceramic line structure will be created. When correctly performed, the sintering process can upgrade the printed material functionality. Additional information regarding 3D sintering may be found in the prior art, for example in U.S. Pat. Nos. 5,155,324, 5,837,960, and 9,901,983.

Lasers have been used to remove or otherwise manipulate materials in a variety of ways. Lasers can ablatively remove a material by disassociating surface atoms. The process is generally referred to as "laser ablation." Practical applications of laser ablation commonly use pulsed lasers, and more commonly use short laser pulses. More recently, lasers of ultrashort pulses have started to have applications in the industry. FIG. 9b illustrates an ablation unit 906. In some embodiments of the present invention, a material ablation can remove defects from the image 902 both before and after curing the image 902. It can also enhance the resolution of the object by cleaning edges and creating an overall smoother surface than would be the case without any ablation. The use of ablation can also increase the printing speed by first using a low resolution printing process (which can be performed in a shorter amount of time as compared to a higher resolution printing process) and then following up with a high resolution cleaning/fixing process in which only excess material is ablated to obtain a very high resolution image in a very short printing run.

Figure 9D:
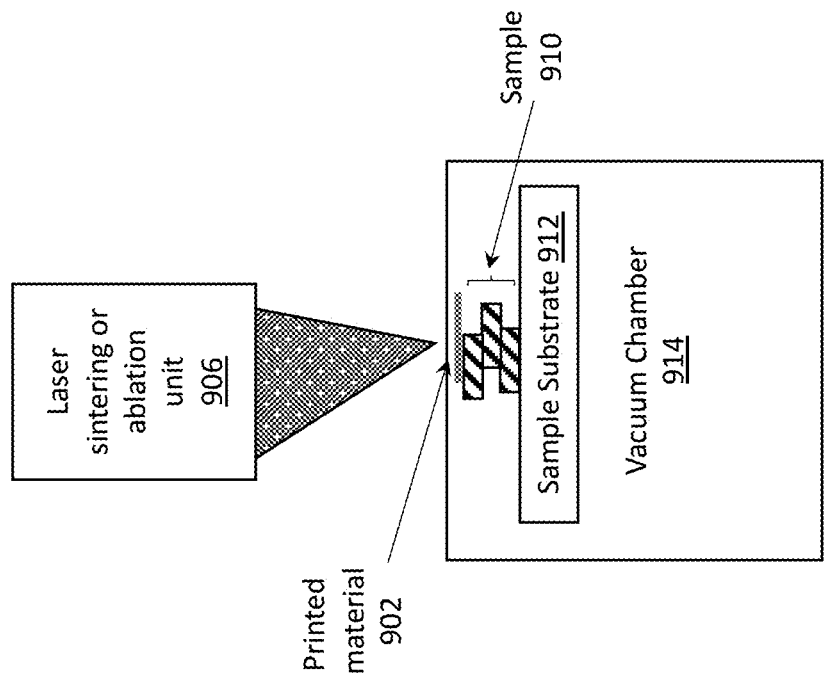
Figure 9C:
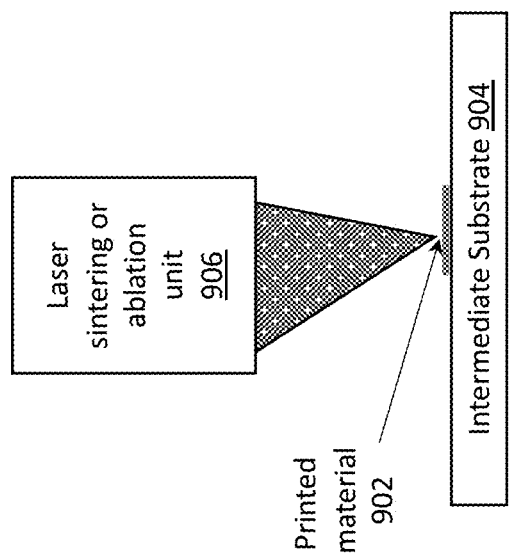

In some embodiments of the present invention, a printed material 902 is ablated or sintered before the printed material 902 is cured at a curing unit, as illustrated in FIG. 9c. In some embodiments of the current invention, the ablation or sintering process is performed directly on the printed material 902 when the printed material 902 is attached to the sample 910 (that is supported on sample substrate 912), as illustrated in FIG. 9d.

In another embodiment of the present invention, sintering of the printed material 902 before addition of the printed material 902 to the sample 910 can be performed in the vacuum chamber 914 to first create, for instance, a conduction line in the printed material 902, before adhering the printed material 902 to the sample 910 at a later time. The printed material 902 can also be sintered on top of the sample 910 if the surface to be sintered and the sample surface are not the same. In the same way, ablating before the curing can be a simple way for cleaning small defects from the to-be printed intermediate substrate 904, but more commonly, it will be used to remove some defects after curing and to enhance resolution and print speed.

Figure 10B:
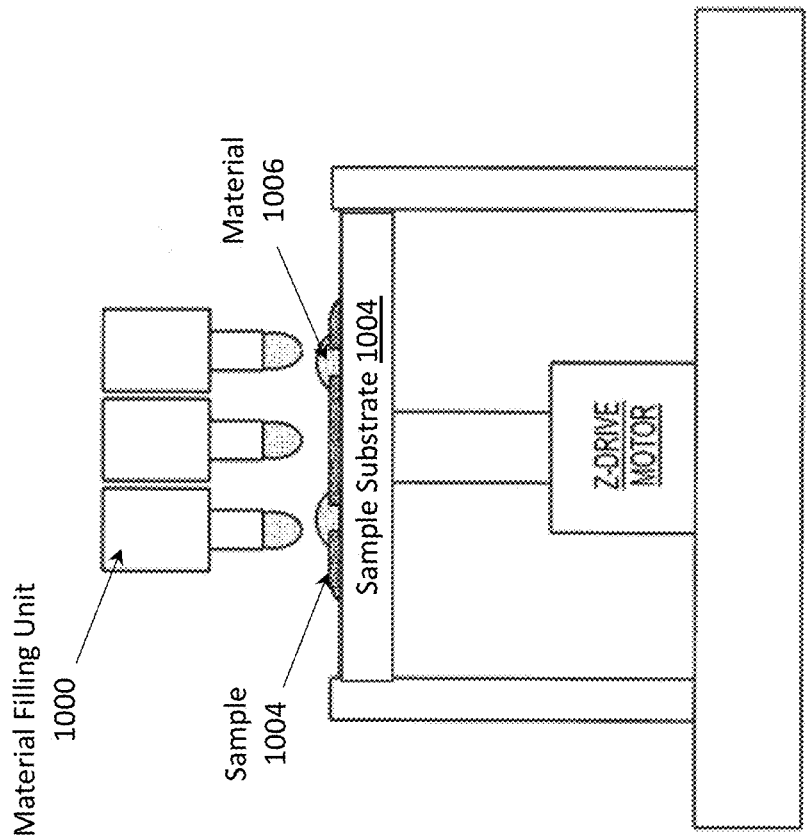
FIGS. 10a and 10b illustrate aspects of using different intermediate stations: an additional material filing unit on the intermediate substrate (FIG. 10a) or directly on the sample (FIG. 10b).
Figure 10A:
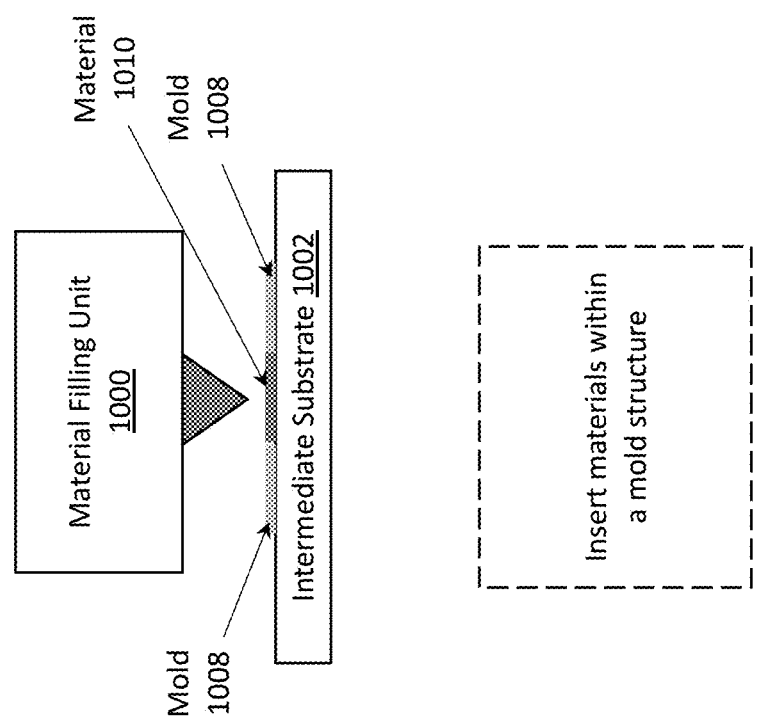

In some embodiments of the present invention, a material is filled inside a cured mold once in a layer or every several layers. FIGS. 10a and 10b illustrate filling a material at a low resolution and removing excess portions of the material. FIG. 10a illustrates a material filling unit 1000 positioned above the intermediate substrate 1002. In some embodiments of the present invention, a UV-curable material can be printed on the intermediate substrate 1002 and cured in the UV curing unit and then a material 1010 can be filled inside the already cured mold 1008. Using an additional adhesion layer, the material within the cured mold can be transferred to the sample. The approach of filling the material on the intermediate substrate 1002 is safer for the sample, since removing excess material is an action that can involve a significant stress to the sample. Therefore, FIG. 10a illustrates filling being performed on the intermediate substrate 1002 and not on the sample.

However, the addition of material directly to the sample is often more convenient from many aspects, and so FIG. 10b illustrates an alternative approach in which the addition of material 1006 directly to the sample 1004 by a material filling unit 1000 takes place. In this way, the material 1006 is added directly to the sample 1004 and excess material is removed by a roller or a knife. In a next step, the material 1006 can be heated or dried to form a solid layer. The use of material filling unit 1000 can be of great importance in the formation of metal and ceramic objects where the mold can be printed and the metal or ceramic paste can be filled into the mold and later de-bound and sintered in an oven at elevated temperatures. That sintering process removes the mold and the binders from the material, and creates a solid high-resolution metal or ceramic object.

Figure 11B:
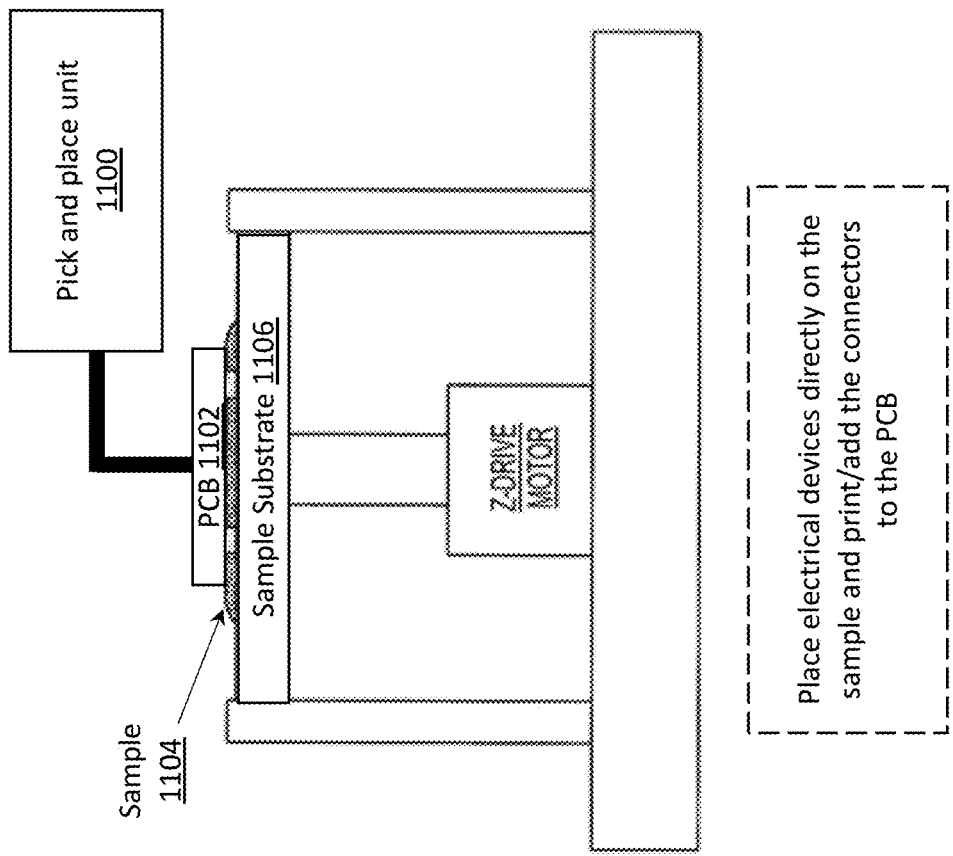
FIGS. 11a and 11b illustrate aspects of using different intermediate stations: an additional pick and place unit on the intermediate substrate (FIG. 11a) or directly on the sample (FIG. 11b).
Figure 11A:
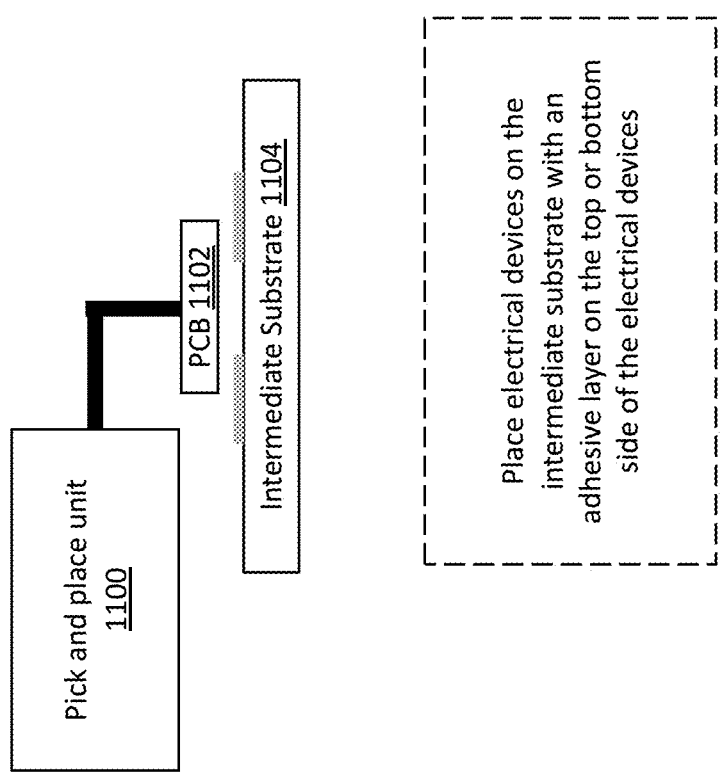

In some embodiments of the present invention, an electronic device or a printed circuit board (PCB) can be used during the buildup of the sample. In such cases, a pick and place unit 1100 can be added to the system and a full assembly can be achieved. FIGS. 11a and 11b illustrate the addition of a pick and place unit 1100 that secures an electronic device 1102 (e.g., a PCB) on the intermediate substrate 1104 by applying an adhesive layer (e.g., that is UV or heat curable) on the top or bottom surface of the electronic device 1102. The pick and place unit 1100 can be part of the sample building unit, and the electronic device 1102 can be added directly to the sample 1104 that is supported on sample substrate 1106, as shown in FIG. 11b.

Thus, systems and methods for printing a viscous material, such as polymeric materials and other pastes, have been described. In various embodiments, these systems and methods employ a multistep procedure in which the viscous material is dispensed onto a donor substrate and is then printed onto an intermediate substrate before finally being transferred, to the curing/sample building unit. The material can go through one or more steps of printing, drying, imaging or any additional system as it proceeds through the various steps in the overall printing process. In order to achieve a very high resolution and high speed in the printing, an intermediate substrate is used, making it possible to create many samples simultaneously. It also makes the printing much more reproducible to print in one place and to transfer to the sample in another place since for the laser jetting it is important to have very well-defined distance control between the coated donor substrate and the intermediate substrate. For that purpose, any of several mechanical solutions can be used. For example, the distance between the coated donor substrate (which may be a film or foil) and the intermediate film may be defined deterministically by having both on the same mechanical part. Alternatively, the distance may be controlled by using a mechanical, well-defined foil or two rollers adjacent to each other. Still further, the distance may be controlled by using a set of three actuators at corners of a support unit that allows both translation and rotation for each substrate.

Although not illustrated in detail, it should be appreciated that the various components of the printing systems described herein operate under the control of one or more controllers, which, preferably, are processor-based controllers that operate under the instruction of machine-executable instructions stored on tangible machine-readable media. Such controllers may include a microprocessor and memory communicatively coupled to one another by a bus or other communication mechanism for communicating information. The memory may include a program store memory, such as a read only memory (ROM) or other static storage device, as well as a dynamic memory, such as a random-access memory (RAM) or other dynamic storage device, and each may be coupled to the bus for providing and storing information and instructions to be executed by the microprocessor. The dynamic memory also may be used for storing temporary variables or other intermediate information during execution of instructions by the microprocessor. Alternatively, or in addition, a storage device, such as a solid state memory, magnetic disk, or optical disk may be provided and coupled to the bus for storing information and instructions. The controller may also include a display, for displaying information to a user, as well as various input devices, including an alphanumeric keyboard and a cursor control device such as a mouse and/or trackpad, as part of a user interface for the printing system. Further, one or more communication interfaces may be included to provide two-way data communication to and from the printing system. For example, network interfaces that include wired and/or wireless modems may be used to provide such communications.

FIG. 12 illustrates a schematic of the full system 1200 that can be combined from all the units described above. In some embodiments of the current invention, only one printing unit with several coating units can be used to print materials on an intermediate substrate. The intermediate substrate is then flipped and moved to the vacuum unit (not depicted) where it can be cured under vacuum conditions and added to the sample during removal from the intermediate substrate. The intermediate substrate is then flipped back and returned to the printing unit.

However, this is only one embodiment of the current invention and a more complicated approach can be used for the formation of other samples. FIG. 12 illustrates a full scheme of the sample production that contains all the components that may be used to process a single layer of sample, as that sample traverses through the system 1200. For example, the layer can be made of several different materials, both UV curable, heat curable or non-curable. The materials of one layer can be added in a serial manner by one or more of printing units 1202*a*, 1202*b*, 1202*c*, 1202*d* to the intermediate substrate and each material can go through an additional suitable treatment already on the intermediate substrate. If it is a UV curable material, it could be cured in an additional UV curing unit 1204. If it is a heat curable or a solvent base material, it could be heated for reacting or for drying in a heating unit 1206. If it is a particle-based material, it could be dried and then sintered in the sintering unit 1208. If it is a material that is printed in low resolution, it can be fixed in the ablation unit 1210. Additionally, if it is an adhesive or structural material, it could also be added in a material filling unit 1212. All the former procedures can be performed directly on the intermediate substrate during the processing of the same layer printing (e.g., using module 1214). The procedures can also be performed repetitively, accumulating several layers on the intermediate substrate before adding the layer to the sample (e.g., using module 1216). During all of these processes and after their completion, the intermediate substrate can be moved to an inspection unit 1218 and a cleaning unit 1220 to be inspected and fixed (if needed). After completion of the layer, the intermediate substrate can be flipped (by sample flipping unit 1222) so that the layer will be built on top of the sample or stay in the same plane if the sample is held upside-down. Next, the intermediate substrate and the sample are held together in a very delicate manner inside a vacuum chamber (not depicted in FIG. 12). The vacuum chamber has an important role in the formation of a full contact without the formation of voids between the intermediate substrate and the sample, but the process can be also performed without the use of a vacuum chamber. After the addition of the new layer to the sample, the intermediate substrate is removed by using both chemical and mechanical aids for the detachment. The sample can be further manipulated to obtain better sample production. For example, if a thermally curable material were added to the sample, the sample could be heated up for reaction or drying inside the vacuum unit or in the additional heating unit 1206. If the sample is a particle-based material, the sample can be sintered under a laser that is added to the vacuum chamber in the sintering unit 1208. If the resolution of the sample should be improved, the sample can be ablated in the vacuum unit or in the additional ablation unit 1210. If some material needs to be filled onto the sample, it can be done in both the sample building unit 1224 and/or in the material filling unit 1212. If some material is needed to be printed on top of the sample, an additional printing unit can be added to the sample building unit 1224. The sample can be inspected before or after the curing inside the vacuum chamber or in the inspection unit 1218. When all processes are finished, the sample is ready for the printing and attachment of the next layer. At the same time, the intermediate substrate can be moved to a cleaning station 1226 to remove unreacted materials from its surface. Data indicating the location and amount of unreacted material can also be used for improving the printing and curing of the next layer. If needed, the intermediate substrate is flipped back by sample flipping unit 1228 and the process may be started from the beginning. Since any number of units can be added, the speed of the process can significantly exceed the speed of any 3D print production machine used today.

In various embodiments then, the invention provides:

1. Systems and methods that enable printing of a viscous material at high resolution and high speed and which include at least one printing unit and an intermediate substrate that communicates the viscous material between the printing unit and a sample building unit.

2. A system or method including a first printing unit that optionally incorporates a coating unit, and that prints a material on an intermediate substrate, and a sample building unit that receives the intermediate substrate and prints a layer of the material therefrom onto a sample.

3. The system or method of embodiment 2, wherein the first printing unit includes the optional coating system, which coating system is configured to create a uniform layer of the material on a donor substrate.

4. The system or method of embodiment 3, wherein the donor substrate is a flexible film substrate or a solid substrate.

5. The system or method of embodiment 3, wherein the coating system includes a syringe of the material and an air or mechanical pump that drives the material from the syringe onto the donor substrate, which donor substrate is then transported toward a well-defined gap between rollers or knifes to create the uniform layer of the material on the donor substrate with a thickness that is defined by the gap.

6. The system or method of embodiment 3, where the coating system includes a screen-printing module in which the material is coated on a screen or stencil of film with well-defined holes using a blade or a squeegee, and the material is transferred from the screen or stencil of film to the donor substrate in a soft or hard engage.

7. The system or method of embodiment 3, wherein the coating system includes a dispenser or an inkjet head to print the material onto the donor substrate.

8. The system or method of embodiment 3, wherein the coating system is a gravure or micro-gravure system that coats the donor substrate with a highly uniform layer of the material.

9. The system or method of embodiment 3, wherein the coating system is a slot-die system that coats the donor substrate with a highly uniform layer of the material.

10. The system or method of embodiment 3, wherein the coating system is a roller coating system that coats the donor substrate with a highly uniform layer of the material.

11. The system or method of embodiment 3, wherein the coating system is included inside a closed cell with a controlled environment to prolong a pot life of the material.

12. The system or method of embodiment 3, wherein the coating system contains more than one material, and is configured to print plural materials onto the intermediate substrate in a controlled sequence.

13. The system or method of embodiment 3, wherein the donor substrate is translatable bi-directionally through the coating unit in a controlled manner by opening a gap between coater rollers, thereby permitting recoating a same area of the donor substrate with the material without contamination to the coater rollers.

14. The system or method of embodiment 2, wherein the material is a solder paste or other metal paste used for printed electronics.

15. The system or method of embodiment 2, wherein the material is a metal paste or a ceramic paste.

16. The system or method of embodiment 2, wherein the material is a highly viscous material.

17. The system or method of embodiment 2, wherein the material is a wax material.

18. The system or method of embodiment 2, wherein the material is a polymer material or a mix of a polymer and a monomer material.

19. The system or method of embodiment 2, wherein the material is a sensitive low viscosity material.

20. The system or method of embodiment 2, wherein the material is curable by UV light or by heating.

21. The system or method of embodiment 2, wherein the material is one that can be dried or reacted by heat, or a thermal cure material.

22. The system or method of embodiment 2, wherein the printing unit is laser-based system that contains a high frequency laser to enable jetting of the material from the donor substrate to the intermediate substrate.

23. The system or method of embodiment 2, wherein the first printing unit is a laser assisted deposition/laser dispensing system rotated by 0-90 degrees or 90-180 degrees from a main axis of a gravitational field within which it is located.

24. The system or method of embodiment 2, wherein the first printing unit is an inkjet head system configured to jet a material directly to the intermediate substrate.

25. The system or method of embodiment 2, wherein the first printing unit is a dispenser head system that prints the material directly to the intermediate substrate.

26. The system or method of embodiment 2, where the first printing unit is an offset printer module, a gravure printing module, or another printing module that prints the material directly to the intermediate substrate.

27. The system or method of embodiment 2, wherein the first printing unit includes a screen-printing module in which the material is coated on a screen or stencil of film with well-defined holes and is subsequently transferred from the screen or stencil of film to the intermediate substrate.

28. The system or method of embodiment 27, wherein a blade or a squeegee is used to transfer the material to the intermediate substrate in a soft or hard engage creating an image directly on the intermediate substrate.

29. The system or method of embodiment 2, wherein the first printing unit includes a gap control unit configured to maintain a well-defined gap between a donor substrate and the intermediate substrate.

30. The system or method of embodiment 29, wherein the gap control unit comprises a plane of three actuators that allows both translation and rotation.

31. The system or method of embodiment 29, wherein the gap control unit comprises a plane of three actuators at corners of both the donor substrate and the intermediate substrate and which allows both translation and rotation of both the donor substrate and the intermediate substrate.

32. The system or method of embodiment 31, wherein the planes of the donor substrate and the intermediate substrate are independent of or riding on each other.

33. The system or method of embodiment 29, wherein the gap control unit comprises a fixed support below the intermediate substrate.

34. The system or method of embodiment 2, wherein the gap control unit comprises a transparent solid substrate as an intermediate substrate.

35. The system or method of embodiment 2, wherein a continuous transparent film substrate is used as the intermediate substrate.

36. The system or method of embodiment 2, wherein a transparent film substrate uncoated or coated by a metal layer or by a metal and a dielectric layer is used as the intermediate substrate.

37. The system or method of embodiment 2, wherein a transparent solid substrate coated or uncoated is used as the intermediate substrate.

38. The system or method of embodiment 2, wherein the intermediate substrate is movable between more than one printing unit and after printing is moved by motors toward other units.

39. The system or method of embodiment 2, wherein the intermediate substrate is a continuous film substrate that by rolling delivers the material printed at the first printing unit to other units.

40. The system or method of embodiment 2, wherein the intermediate substrate is a transparent solid substrate that delivers the material printed at the first printing unit to other units by a robotic arm or rails, with optional change(s) in direction.

41. The system or method of embodiment 2, further comprising a unit configured to cure the material or dry the material by heat during movement of the intermediate substrate from the first printing unit.

42. The system or method of embodiment 2, further comprising an imaging system configured to image the material during movement of the intermediate substrate from the first printing unit to any other unit.

43. The system or method of embodiment 42, wherein the imaging system is a microscope or a CCD configured to take a picture of a printed image of the material on the intermediate substrate.

44. The system or method of embodiment 43, wherein the imaging system is configured to transfer data gathered by the imaging system to another unit of the system for accurate deposition of the printed image of the material onto the sample or for cleaning the intermediate substrate.

45. The system or method of embodiment 42, wherein the imaging system is a 3D microscope that is configured to take a picture of a printed image of the material on the intermediate substrate and measure it in 3 dimensions.

46. The system or method of embodiment 45, wherein the imaging system is configured to transfer data gathered by the imaging system to another unit of the system for accurate deposition of the printed image of the material onto the sample or for cleaning the intermediate substrate.

47. The system or method of embodiment 2, wherein the system contains one or more additional printing units and is configured to print one or more materials to the intermediate substrate in each of the first and additional printing units.

48. The system or method of embodiment 47, further comprising one or more of a laser sintering system and a laser ablation system, each in dedicated units, and configured to process the material by laser sintering system or by laser ablation, as appropriate, during movement of the intermediate substrate from the one or more of the first or additional printing units to the sample building unit.

49. The system or method of embodiment 42, wherein the any other units include components positioned before, in, and/or after the sample building unit along a path of travel of the material on the intermediate substrate.

50. The system or method of embodiment 42, wherein the imaging system is configured to image the intermediate substrate, the sample, or both.

51. The system or method of embodiment 42, wherein at least portions of the imaging system located at the sample building unit include a mirror arranged to permit imaging a surface of the intermediate substrate, or, by using a main laser channel of a sintering or ablation unit, imaging dimensions of an image of the material on the intermediate substrate and a target area of the sample simultaneously.

52. The system or method of embodiment 2, wherein the sample building unit contains a laser-based system that contains a high frequency laser configured to jet or detach an image of the material from the intermediate substrate to the sample.

53. The system or method of embodiment 2, wherein the sample building unit contains a laser-based system that contains a high frequency laser configured to ablate or sinter an image of the material on the sample.

54. The system or method of embodiment 2, further comprising a filing material and planarization unit and/or a pick and place unit disposed in a path of travel of the intermediate substrate.

55. The system or method of embodiment 2, wherein the sample building unit includes a filing material and planarization unit or a pick and place unit.

56. The system or method of embodiment 2, wherein the sample building unit includes a second printing unit that includes a deposition position at which the intermediate substrate engages the final substrate directly.

57. The system or method of embodiment 2, wherein the sample building unit includes a UV light or a heating unit and is configured to cure by the UV light or dry by the heater, as appropriate, the final substrate after printing of the material to the final substrate in a second printing unit of the sample building unit.

58. The system or method of embodiment 2, wherein the first printing unit includes a UV light or a heating unit and is configured to cure by the UV light or dry by the heater, as appropriate, the material printed on the intermediate substrate and to return the intermediate substrate to the first printing unit or another printing unit for printing of a second or additional layer of a second material.

What is claimed is:

1. A system, comprising:
   a printing unit configured to print an image of a material on an intermediate substrate;
   a sample building unit configured to receive the intermediate substrate having the image of the material printed thereon and to transfer the image from the intermediate substrate to a sample located in a vacuum chamber of the sample building unit; and
   an ultra violet (UV) light source configured to cure portions of the image of the material printed on the intermediate substrate during movement of the intermediate substrate having the image of the material printed thereon from the printing unit to the sample building unit.

2. The system of claim 1, wherein the printing unit includes a coating system configured to create a uniform layer of the material on a donor substrate, and the printing unit is further configured to transfer the image of the material from the donor substrate onto the intermediate substrate.

3. The system of claim 2, wherein the coating system includes a syringe of the material and an air or mechanical pump arranged to drive the material from the syringe onto the donor substrate, and the coating system is further configured to transport the donor substrate with the material thereon towards and through a well-defined gap between rollers or knives to create a uniform layer of the material on the donor substrate, the uniform layer of the material having a thickness that is defined by the well-defined gap.

4. The system of claim 2, wherein the coating system includes a screen-printing module configured to coat a screen or stencil of film having well-defined holes with the material, and the coating system is further configured to transfer the material to the intermediate substrate from the screen or stencil of film using a blade or a squeegee.

5. The system of claim 2, wherein the coating system comprises one of: a dispenser or an inkjet head configured to print the material onto the donor substrate, a gravure or micro-gravure system configured to coat the donor substrate with the uniform layer of material, a slot-die system configured to coat the donor substrate with the uniform layer of the material, and a roller coating system configured to coat the donor substrate with the uniform layer of the material.

6. The system of claim 2, wherein the coating system is enclosed in a controlled environment.

7. The system of claim 2, wherein the coating system is configured to apply the material and other materials onto the donor substrate in a plurality of printing procedures.

8. The system of claim 2, where the material comprises one of: a highly viscous material, a solder paste or other metal paste used for printed electronics, a metal paste, a ceramic paste, a wax material, a polymer material or a mix of a polymer and a monomer material, a low viscosity material, a material that can be cured by UV light or by heating, or a material that can be dried.

9. The system of claim 1, wherein the printing unit comprises a laser-based system that includes a high frequency laser configured to jet the image of the material from a respective donor substrate to the intermediate substrate.

10. The system of claim 1, wherein the printing unit is a laser assisted deposition/laser dispensing system rotated by 0-90 degrees or 90-180 degrees from a main axis of a gravitational field within which the printing unit is located.

11. The system of claim 1, wherein the printing unit comprises one of an inkjet head system, a dispenser head system, an offset printer module, or a gravure printing module, and wherein the printing unit is configured to print dot-like portions of the material directly to the intermediate substrate.

12. The system of claim 2, wherein the printing unit is configured to maintain a well-defined gap between the donor substrate and the intermediate substrate.

13. The system of claim 2, wherein the intermediate substrate is a continuous film substrate and the system includes rollers arranged to deliver the image of the material printed on the intermediate substrate from the printing unit to the sample building unit.

14. The system of claim 2, wherein the intermediate substrate is a transparent solid substrate and the system includes a robotic arm configured to deliver the image of the material printed on the intermediate substrate from the printing unit to the sample building unit.

15. The system of claim 1, further comprising an imaging system arranged to measure the image of the material printed on the intermediate substrate during movement of the intermediate substrate from the printing unit to the sample building unit.

16. The system of claim 15, wherein the imaging system is configured to measure the image in two or three dimensions and to transfer data gathered by said measuring to a cleaning unit for cleaning the intermediate substrate in case of a defect in the image of the material or to other additional units for further processing of the image of the material before transfer of the image of the material to the sample in the sample building unit.

17. The system of claim 2, further comprising a sintering and/or an ablation unit configured to further process the image of the material printed on the intermediate substrate.

18. The system of claim 2, further comprising a material filling unit configured to fill a molded cured layer with a non-curable or slow curing material.

19. The system of claim 2, wherein the sample building system is contained in a vacuum chamber.

20. A method, comprising:
    printing by a printing unit an image of a material onto an intermediate substrate;
    transferring the image of the material printed on the intermediate substrate to a sample located in a vacuum chamber of a sample building unit configured to receive the intermediate substrate having the image of material printed thereon; and
    while the intermediate substrate having the image printed thereon is being transferred from the printing unit to the sample building unit, curing by an ultra violet (UV) light source portions of the image of the material printed on the intermediate substrate.

21. The method of claim 20, wherein printing the material onto the intermediate substrate comprises:
    creating by a coating system of the printing unit a uniform layer of the material on a donor substrate; and
    transferring portions of the uniform layer of the material from the donor substrate onto the intermediate substrate.

22. The method of claim 20, wherein printing the material onto the intermediate substrate comprises:
    driving the material from a syringe of a coating system of the printing unit onto a donor substrate;
    transporting the donor substrate with the material thereon towards and through a well-defined gap between rollers or knifes to create a uniform layer of the material on the donor substrate, the uniform layer of the material having a thickness that is defined by the well-defined gap; and
    transferring portions of the uniform layer of the material from the donor substrate onto the intermediate substrate.

23. The method of claim 20, wherein printing the material onto the intermediate substrate comprises:
    coating, by a screen-printing module of a coating system of the printing unit, a screen or stencil of film having well-defined holes with the material; and
    transferring the material from the screen or stencil of film to the intermediate substrate using a blade or a squeegee.

24. The method of claim 20, wherein the image of material printed on the intermediate substrate, the sample, before or after the transfer of the image of material thereto, or both are (i) heated with a heater, (ii) imaged using one or more imaging systems, (iii) sintered or ablated using a laser system, (iv) filled with material that is non-curable or has a slow curing rate, or (v) all of the above.

25. The method of claim 20, further comprising after printing the image of the material on the intermediate substrate, flipping the intermediate substrate such that the image of the material is oriented adjacent to the sample.

* * * * *